(12) United States Patent
Shinohara

(10) Patent No.: US 7,212,722 B2
(45) Date of Patent: May 1, 2007

(54) BACKLIGHT UNIT AND LIQUID-CRYSTAL DISPLAY DEVICE USING THE SAME

(75) Inventor: Toshiya Shinohara, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 11/299,951

(22) Filed: Dec. 13, 2005

(65) Prior Publication Data

US 2006/0147175 A1    Jul. 6, 2006

(30) Foreign Application Priority Data

Jan. 5, 2005    (JP)    ............................. 2005-000358

(51) Int. Cl.
  *G02B 6/10*    (2006.01)
(52) U.S. Cl. .................................... 385/146
(58) Field of Classification Search ................ 385/146
   See application file for complete search history.

(56) References Cited

U.S. PATENT DOCUMENTS

| | | | |
|---|---|---|---|
| 5,838,400 A * | 11/1998 | Ueda et al. ................ | 349/58 |
| 2004/0257791 A1* | 12/2004 | Chen et al. ................ | 362/31 |
| 2005/0083448 A1* | 4/2005 | Ishida ....................... | 349/58 |
| 2006/0029355 A1* | 2/2006 | Lin ........................... | 385/137 |
| 2006/0125981 A1* | 6/2006 | Okuda ....................... | 349/110 |
| 2006/0126362 A1* | 6/2006 | Hsieh et al. ............... | 362/633 |

FOREIGN PATENT DOCUMENTS

JP    11-352476    12/1999

* cited by examiner

*Primary Examiner*—Ellen E. Kim
(74) *Attorney, Agent, or Firm*—Whitham Curtis Christofferson & Cook, P.C.

(57) ABSTRACT

A backlight unit that makes it sure to assemble many optical members in a casing in a right order with their right attitude in its assembly stage is provided. Each of the optical members to be assembled in a predetermined order has a protruding part including at least one protrusion. A count of the protrusions of each member is increased according to the predetermined assembly order. The casing has a depressed part for receiving the protrusions of the members, the depressed part including notches or depressions corresponding to the protrusions of the optical members. Each of the notches or depressions has a depth in a stacking direction that varies according to stacking state of the optical members. The notches or depressions may be formed to penetrate through the casing to thereby confirm easily the order and attitude of the assembled members after the assembly operation.

19 Claims, 19 Drawing Sheets

BACKLIGHT UNIT AND LIQUID-CRYSTAL DISPLAY DEVICE USING THE SAME

BACKGROUND OF THE INVENTION

1. Field of the Invention

The present invention relates to a backlight unit and a Liquid-Crystal Display (LCD) device using the backlight unit. The invention is applicable to any other display device than the LCD device if it comprises sheet- or plate-shaped optical members arranged in a casing, for example, a display device employing an organic EL (ElectroLuminescence) element as a backlight.

2. Description of the Related Art

The LCD device has been extensively used as a monitor of the so-called Office Automation (OA) apparatus or television (TV) set because of its characters such as compactness, thinness, and low power-consumption. The LCD device comprises as its main components a LCD panel having a pair of opposing transparent substrates and a liquid crystal layer interposed between the substrates, and a backlight unit for generating backlight illuminating the panel. The backlight unit comprises as its main components a light source, optical members (e.g., a light-guiding plate, a diffusion sheet, a lens sheet, and a polarization sheet) for converting the light emitted from the source to uniform illumination light, and a casing for holding and/or covering the light source and the optical members.

The above-described optical members have their own assembling orders in the casing, which are defined in advance. Moreover, the attitude or layout of these members with respect to the casing, such as the front and back, the top and bottom, and the left and right of the respective members, is also defined beforehand. However, the appearance of these members is similar and therefore, these members are likely to be placed at a wrong order and/or in a wrong direction. As a result, there arise unfavorable conditions or states, such as degradation of luminance, and non-uniform distribution of luminance. To confirm the right assembling order and the right attitude of these optical members after the assembling operation of the backlight unit is completed, a technique as shown in FIGS. 1A to 1C was developed. This technique was disclosed in the Patent Document 1 (the Japanese Non-Examined Patent Publication No. 11-352476 published in 1999), in particular, on pages 2 to 4 and FIG. 1.

As shown in FIGS. 1A and 1B, ear-like parts 118a and 118b are respectively formed on a first lens sheet 117a and a second lens sheet 117b in their predetermined regions outside the angle of view in such a way that the parts 118a and 118b are not entirely overlapped on each other. On the other hand, an eliminated or depressed part 120 is formed on a frame-shaped casing 119 to receive the ear-like parts 118a and 118b of the sheets 117a and 117b. When the sheets 117a and 117b are assembled in the casing 119 in a predetermined order, the parts 118a and 118b are overlapped in the state as shown in FIG. 1C, where the part 118a is partially seen through the central gap or slit of the part 118b. Thus, the assembling order of the first and second lens sheets 117a and 117b can be discriminated by observing in a specific direction the parts 118a and 118b inserted into the depressed part 120 of the casing 119.

By using the above-described technique disclosed by the Patent Document 1, the count and inserted order of the lens sheets 117a and 117b can be visually inspected after the assembling operation of the backlight unit is completed. However, with this configuration, the depressed part 120 of the casing 119 has a size large enough for receiving both of the ear-like parts 118a and 118b and therefore, the sheets 117a and 117b may be arranged in an unfavorable order. As a result, whether or not the assembling order of the sheets 117a and 117b is right cannot be judged in the assembling stage of the backlight unit. If some problem or malfunction is visually found after the assembling operation of the backlight unit is completed, the unit needs to be reassembled.

Moreover, with the above-described configuration disclosed by the Patent Document 1, when the count of the lens sheets is limited to approximately two, whether the assembling order of the lens sheets is right can be judged by visually checking the state of the overlapped parts 118a and 118b. However, when the count of the lens sheets used is equal to three or more, the overlapping state of the parts 118a and 118b will be complicated. Therefore, it is not easy to judge the rightness of the assembling order of the lens sheets from the overlapping state of the parts 118a and 118b. In particular, optical members such as the lens sheets, the light-guiding plate, the diffusion sheet, and the polarization sheet are all translucent and thus, it will be more difficult to judge the rightness of the assembling order of the optical members.

SUMMARY OF THE INVENTION

The present invention was created in consideration of the above-described problems of the technique disclosed in the Patent Document 1.

Accordingly, a first object of the present invention is to provide a backlight unit that makes it sure to assemble many optical members in a casing in a right order with a right attitude in its assembly stage, and a LCD device equipped with the unit.

Another object of the present invention is to provide a backlight unit that makes it possible to easily confirm the order and attitude of the assembled optical members after the assembly operation of the unit is completed, and a LCD device equipped with the unit.

The above objects together with others not specifically mentioned will become clear to those skilled in the art from the following description.

According to a first aspect of the present invention, a backlight unit is provided, which comprises a light source; optical members each having a sheet- or plate-like shape; and a frame-shaped casing for holding the optical members, the optical members being stacked and assembled in the casing. Each of the optical members has a protruding part that protrudes along its plane, the protruding part including at least one protrusion. A count of the protrusions of each of the optical members is increased according to a predetermined assembly order in the casing. The casing has a depressed part for receiving the protruding parts of the optical members, the depressed part including notches corresponding to the protrusions of the optical members. Each of the notches has a depth in a stacking direction that varies according to stacking state of the optical members.

With the backlight unit according to the first aspect of the present invention, each of the optical members has a protruding part including at least one protrusion. A count of the protrusions of each of the optical members is increased according to a predetermined assembly order in the casing. On the other hand, the casing has a depressed part including notches corresponding to the protrusions of the optical members. Each of the notches has a depth in a stacking direction that varies according to stacking state of the optical members.

Therefore, if the assemble order of one of the optical members is in error, the said member will be in a floating state from the bottom of the casing or from the other of the members assembled formerly. As a result, by visually checking whether or not the assembled member is in a floating state, the rightness of the assembly order and attitude of the said member can be confirmed easily in the assembly stage of the backlight unit. This means that many optical members can be surely assembled in the casing in a right order with a right attitude in the assembly stage of the unit.

In a preferred embodiment according to the first aspect of the present invention, the optical member to be assembled in a second order or later comprises the protrusion formed at a same position as that of the optical member to be stacked in a preceding order. The protrusion of the member in the second order or later is the same in size and shape as the member to be stacked in the preceding order. The depth of each of the notches is defined according to a total thickness of the stacked optical members having the protrusions at the same position.

In another preferred embodiment according to the first aspect of the present invention, the notches are formed to penetrate through the casing from inside of the casing to outside thereof. In this embodiment, there is an additional advantage that the order and attitude of the assembled optical members can be easily confirmed after the assembly operation of the unit is completed.

In this embodiment, it is preferred that the protrusions are formed to stick out of the casing through the corresponding notches when the optical members are assembled in the casing, and that the protrusions are visually recognizable from outside of the casing after assembling operation of the backlight unit is completed. In this case, there is an additional advantage that the post-assembly confirmation of the order and attitude of the assembled optical members can be conducted more easily.

In still another preferred embodiment according to the first aspect of the present invention, the at least one protrusion of each of the optical members is located on at least one edge of the member at a position excluding symmetrical positions on the edge. In this embodiment, there is an additional advantage that not only the right order but also the right attitude of the optical members can be ensured in the assembly stage of the backlight unit.

According to a second aspect of the present invention, another backlight unit is provided, which comprises a light source; optical members each having a sheet- or plate-like shape; and a frame-shaped casing for holding the optical members, the optical members being stacked and assembled in the casing. Each of the optical members has a protruding part that protrudes along its plane, the protruding part including a protrusion. A width or shifted distance of the protrusion of each of the optical members is increased according to a predetermined assembly order in the casing. The casing has a depressed part for receiving the protruding parts of the optical members, the depressed part including notches corresponding to the protrusions of the optical members. Each of the notches has a depth in a stacking direction that varies according to stacking state of the optical members.

With the backlight unit according to the second aspect of the present invention, each of the optical members has a protruding part including a protrusion. A width or shifted distance of the protrusion of each of the optical members is increased according to a predetermined assembly order in the casing. On the other hand, the casing has a depressed part including notches corresponding to the protrusions of the optical members. Each of the notches has a depth in a stacking direction that varies according to stacking state of the optical members.

Therefore, similar to the backlight unit according to the first aspect, if the assemble order of one of the optical members is in error, the said member will be in a floating state from the bottom of the casing or from the other of the members assembled formerly. As a result, by visually checking whether or not the assembled member is in a floating state, the rightness of the assembly order and attitude of the said member can be confirmed easily in the assembly stage of the backlight unit. This means that many optical members can be surely assembled in the casing in a right order with a right attitude in the assembly stage of the unit.

In a preferred embodiment according to the second aspect of the present invention, the optical member to be assembled in a second order or later comprises the protrusion wider than that of the optical member to be stacked in a preceding order. The depth of each of the notches is defined according to a total thickness of the stacked optical members.

In another preferred embodiment according to the second aspect of the present invention, the optical member to be assembled in a second order or later comprises the protrusion shifted at a greater distance than that of the optical member to be stacked in a preceding order. The depth of each of the notches is defined according to a total thickness of the stacked optical members.

In still another preferred embodiment according to the second aspect of the present invention, the notches are formed to penetrate through the casing from inside of the casing to outside thereof. In this embodiment, there is an additional advantage that the order and attitude of the assembled optical members can be easily confirmed after the assembly operation of the unit is completed.

In this embodiment, it is preferred that the protrusions are formed to stick out of the casing through the corresponding notches when the optical members are assembled in the casing, and that the protrusions are visually recognizable from outside of the casing after assembling operation of the backlight unit is completed. In this case, there is an additional advantage that the post-assembly confirmation of the order and attitude of the assembled optical members can be conducted more easily.

In a further preferred embodiment according to the second aspect of the present invention, the at least one protrusion of each of the optical members is located on at least one edge of the member at a position excluding symmetrical positions on the edge. In this embodiment, there is an additional advantage that not only the right order but also the right attitude of the optical members can be ensured in the assembly stage of the backlight unit.

According to a third aspect of the present invention, still another backlight unit is provided, which comprises a light source; optical members each having a sheet- or plate-like shape; and a frame-shaped casing for holding the optical members, the optical members being stacked and assembled in the casing. Each of the optical members has a depressed part including at least one notch. A count of the notches of each of the optical members is decreased according to a predetermined assembly order in the casing. The casing has a protruding part to be fittingly engaged with the depressed parts of the optical members, the protruding part including protrusions corresponding to the notches of the optical members. Each of the protrusions has a height in a stacking direction that varies according to stacking state of the optical members.

With the backlight unit according to the third aspect of the present invention, each of the optical members has a depressed part including at least one notch. A count of the notches of each of the optical members is decreased according to a predetermined assembly order in the casing. On the other hand, the casing has a protruding part including protrusions corresponding to the notches of the optical members. Each of the protrusions has a height in a stacking direction that varies according to stacking state of the optical members.

Therefore, similar to the backlight unit according to the first aspect, if the assemble order of one of the optical members is in error, the said member will be in a floating state from the bottom of the casing or from the other of the members assembled formerly. As a result, by visually checking whether or not the assembled member is in a floating state, the rightness of the assembly order and attitude of the said member can be confirmed easily in the assembly stage of the backlight unit. This means that many optical members can be surely assembled in the casing in a right order with a right attitude in the assembly stage of the unit.

In a preferred embodiment according to the third aspect of the present invention, the optical member to be assembled in a second order or later comprises the notch formed at a same position as that of the optical member to be stacked in a preceding order. The notch of the member in the second order or later is the same in size and shape as the member to be stacked in the preceding order. The height of each of the protrusions is defined according to a total thickness of the stacked optical members having the protrusions at the same position.

In another preferred embodiment according to the third aspect of the present invention, the at least one notch of each of the optical members is located on at least one edge of the member at a position excluding symmetrical positions on the edge. In this embodiment, there is an additional advantage that not only the right order but also the right attitude of the optical members can be ensured in the assembly stage of the backlight unit.

According to a fourth aspect of the present invention, a further backlight unit is provided, which comprises a light source; optical members each having a sheet- or plate-like shape; and a frame-shaped casing for holding the optical members, the optical members being stacked and assembled in the casing. Each of the optical members has a depressed part including a notch. A width or shifted distance of the notch of each of the optical members is decreased according to a predetermined assembly order in the casing. The casing has a protruding part to be fittingly engaged with the depressed parts of the optical members, the protruding part including protrusions corresponding to the notches of the optical members. Each of the protrusions having a height in a stacking direction that varies according to stacking state of the optical members.

With the backlight unit according to the fourth aspect of the present invention, similar to the backlight unit according to the third aspect, each of the optical members has a depressed part including a notch. A width or shifted distance of the notch of each of the optical members is decreased according to a predetermined assembly order in the casing. On the other hand, the casing has a protruding part including protrusions corresponding to the notches of the optical members. Each of the protrusions has a height in a stacking direction that varies according to stacking state of the optical members.

Therefore, if the assemble order of one of the optical members is in error, the said member will be in a floating state from the bottom of the casing or from the other of the members assembled formerly. As a result, by visually checking whether or not the assembled member is in a floating state, the rightness of the assembly order and attitude of the said member can be confirmed easily in the assembly stage of the backlight unit. This means that many optical members can be surely assembled in the casing in a right order with a right attitude in the assembly stage of the unit.

In a preferred embodiment according to the fourth aspect of the present invention, the optical member to be assembled in a second order or later comprises the notch formed at a same position as that of the optical member to be stacked in a preceding order. The notch of the member in the second order or later is the same in size and shape as the member to be stacked in the preceding order. The height of each of the protrusions is defined according to a total thickness of the stacked optical members having the protrusions at the same position.

In another preferred embodiment according to the fourth aspect of the present invention, the at least one notch of each of the optical members is located on at least one edge of the member at a position excluding symmetrical positions on the edge. In this embodiment, there is an additional advantage that not only the right order but also the right attitude of the optical members can be ensured in the assembly stage of the backlight unit.

According to a fifth aspect of the present invention, a liquid-crystal display device is provided, which comprises a liquid-crystal display panel; and one of the backlight units as described above.

In a preferred embodiment of the device according to the fifth aspect of the present invention, the liquid-crystal display panel is held by the casing, and the optical members are fixed by the panel and the casing.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Figure 1A:
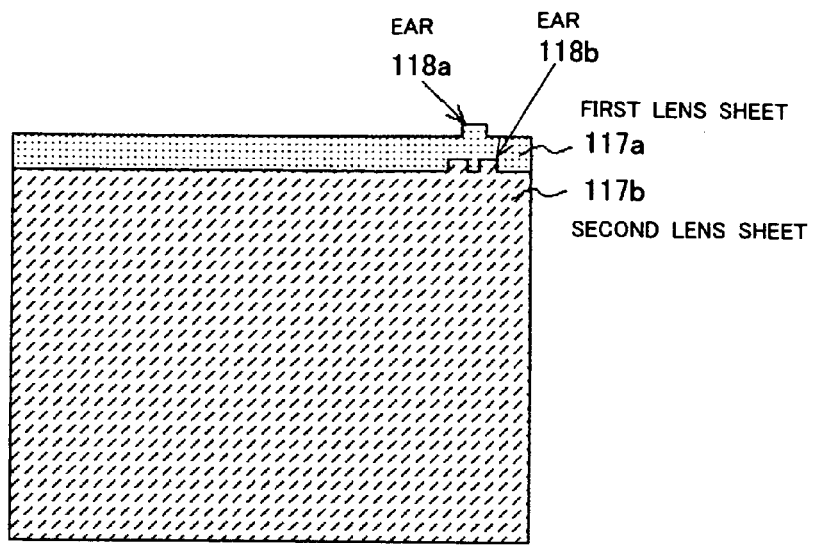
FIG. 1A is a schematic front view showing the structure of the lens sheets of a prior-art backlight unit.
Figure 1B:
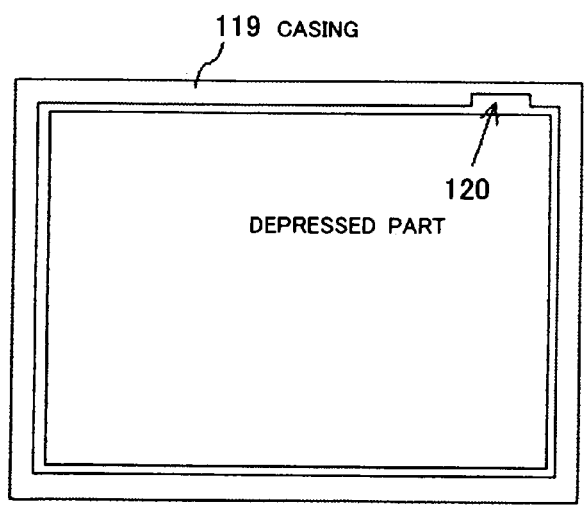
FIG. 1B is a schematic front view showing the structure of the frame-shaped casing of the prior-art backlight unit of FIG. 1A.
Figure 1C:
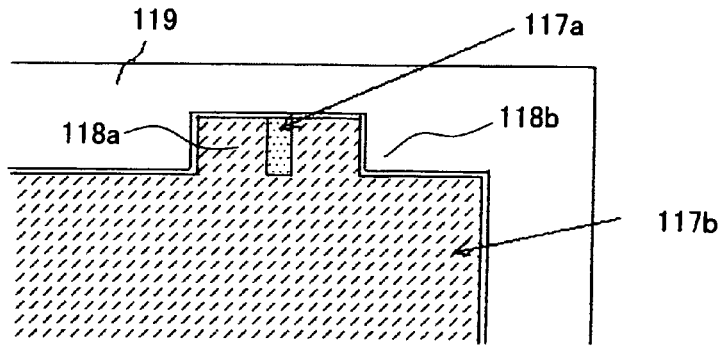
FIG. 1C is an enlarged, partial, schematic front view showing the assembled structure of the lens sheets and the casing of the prior-art backlight unit of FIG. 1A.

Preferred embodiments of the present invention will be described in detail below while referring to the drawings attached.

As explained in the BACKGROUND OF THE RELATED ART, the backlight unit of the LCD device comprises many optical members assembled in a predetermined way, such as a light-guiding plate, a diffusion sheet, a lens sheet, and a polarization sheet, to uniformly illuminate the LCD panel. If these members are not assembled in a right or suitable order, desired uniform illumination light will not be generated. Similarly, if the front and back, the top and bottom, or the right and left of these members are inverted and assembled in the assembly stage, desired uniform illumination light will not be generated as well. However, the front and back, the top and bottom, and the right and left of these members are difficult to be discriminated at a glance. Therefore, there is a problem that malfunction is likely to occur due to false assembly of the optical members.

To cope with the said problem, with the prior-art configuration of the Patent Document 1, an ear or ear-like part is formed on each of the lens sheets in such a way that these ears or ear-like parts are not superposed on each other. At the same time, a depressed or removed part is formed on the frame-shaped casing corresponding to the ears. Thus, the count and the assembling order of the lens sheets can be discriminated by observing them after the assembling operation of the backlight unit is completed. However, the depressed part of the casing has a shape that receives the ear of any of the sheets and therefore, the sheets may be assembled in a wrong order. Moreover, when the count of the lens sheets or optical members is large, the shape of the overlapped ears will be complicated. As a result, there is a problem that the order and attitude of the assembled sheets or members are unable to be discriminated easily.

Accordingly, with the present invention, each of the optical members comprises a protruding part including at least one protrusion (or a depressed part including at least one notch or depression or hole), where the count or width or the shifted distance of the protrusions (or notches or depressions or holes) is different. At the same time, the casing comprises a depressed part including at least one notch or depression or hole having a different depth or depths corresponding to the stacking state of the members (or a protruding part including at least one protrusion having a different height or heights corresponding to the stacking state of the members). Thus, all the optical members can be stacked and assembled in the casing only in the predetermined order with the predetermined attitude, thereby preventing the generation of any malfunction that may occur in the assemble stage of the backlight unit.

Furthermore, the depression(s) or notch(es) or hole(s) of the casing may be formed to penetrate through the casing and at the same time, the protrusion(es) of each optical member may be formed to stick out of the penetrating depression(s) or notch(es) or hole(s). In this case, the order and attitude of the assembled optical members can be confirmed from the outside of the casing, which makes it possible to find any malfunction or unfavorable state after the assembling operation of the backlight is completed.

Concrete structures of the above-described embodiments of the invention will be explained below with reference to the drawings attached.

FIRST EMBODIMENT

A backlight unit 1 and a LCD device with the unit 1 according to a first embodiment of the invention will be explained with reference to FIG. 2 to FIG. 11B.

Figure 2:
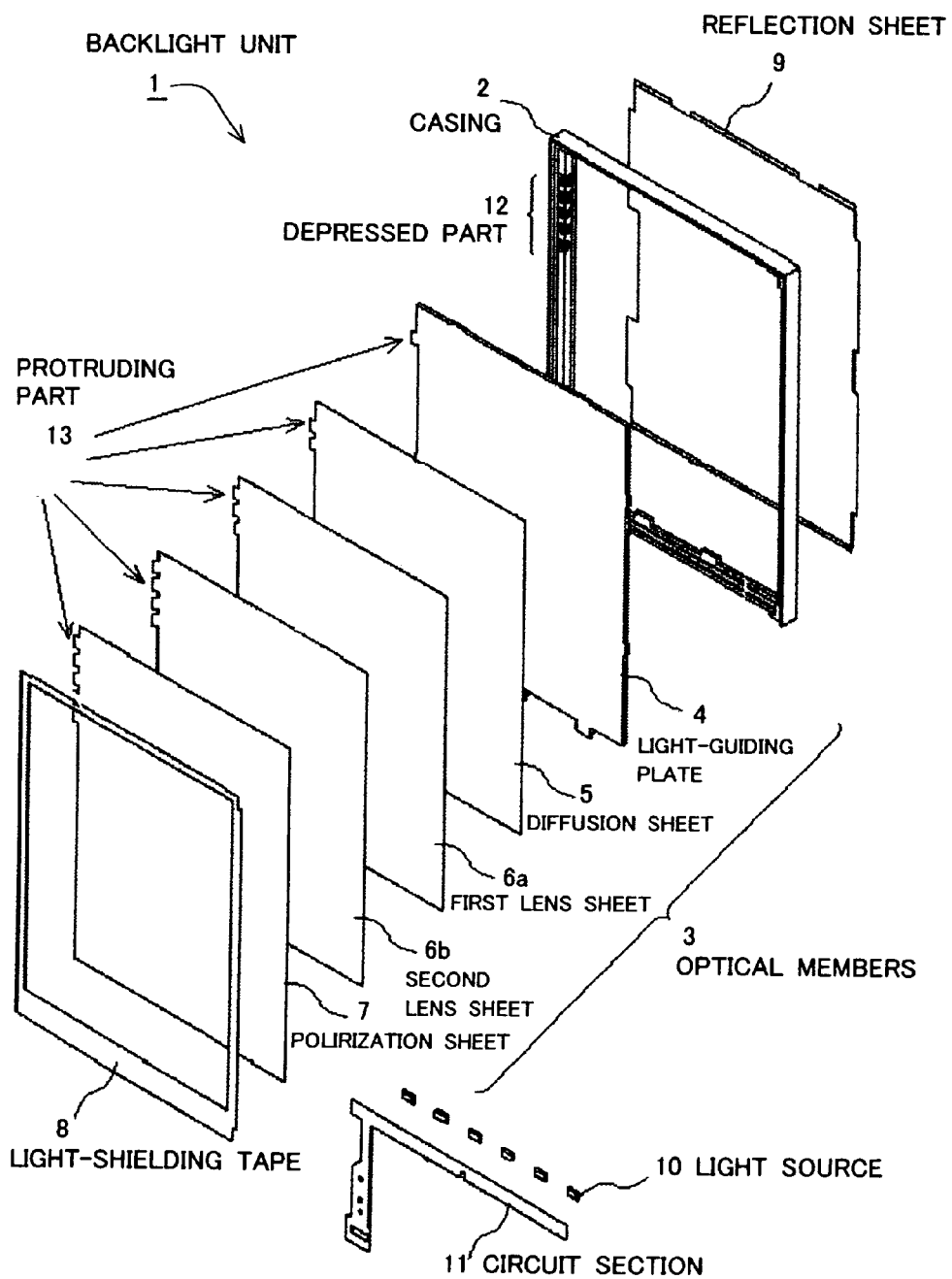
FIG. 2 is an exploded perspective view of the backlight unit according to the first embodiment of the invention.
Figure 3:
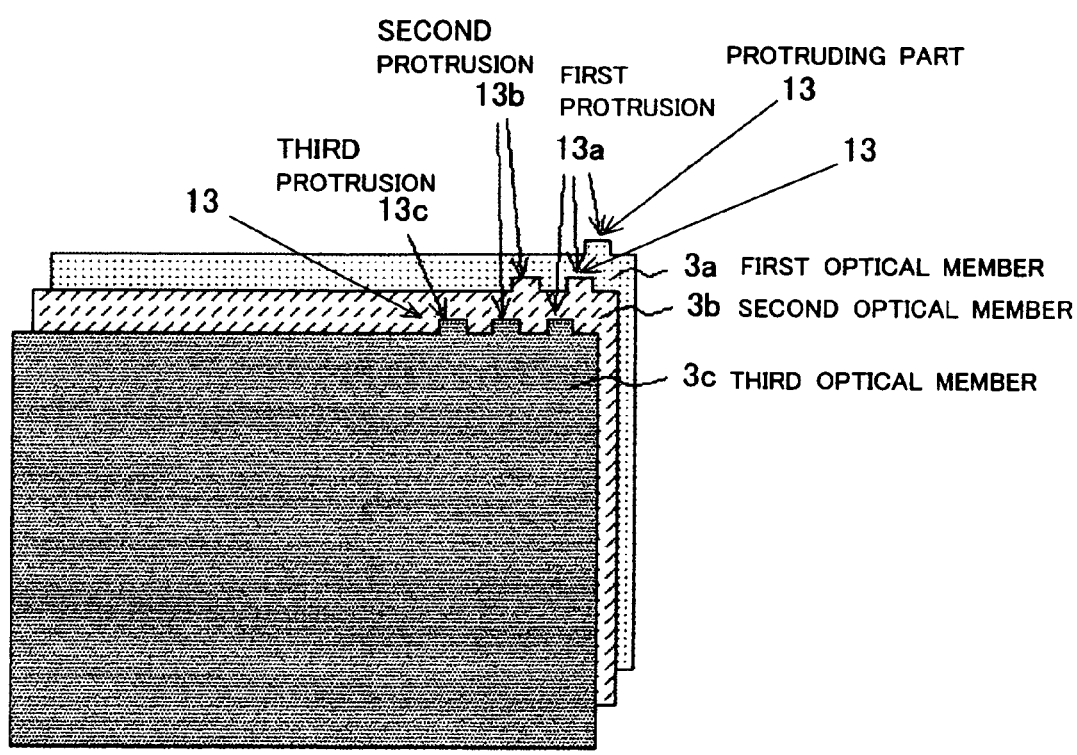
FIG. 3 is a schematic front view showing the structure of the optical elements of the backlight unit according to the first embodiment of the invention.
Figure 4A:
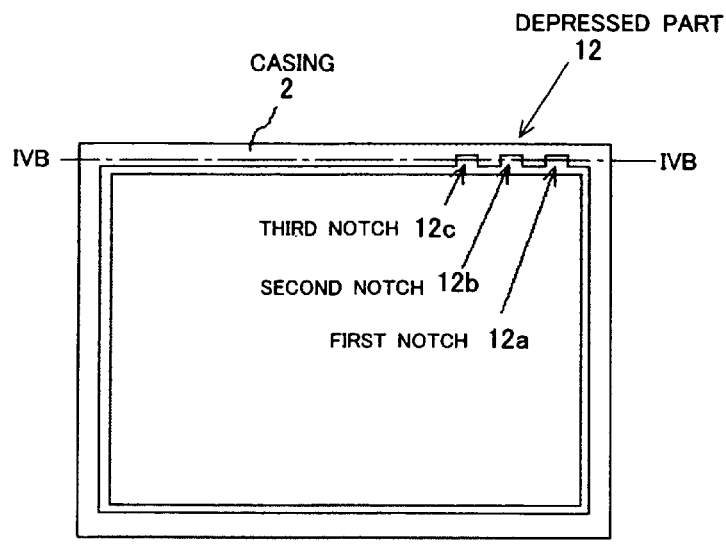
FIG. 4A is a schematic front view showing the structure of the casing of the backlight unit according to the first embodiment of the invention.
Figure 4B:
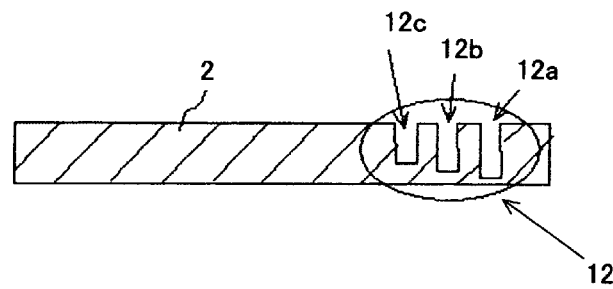
FIG. 4B is a schematic cross-sectional view along the line VIB—VIB in FIG. 4A.
Figure 4C:
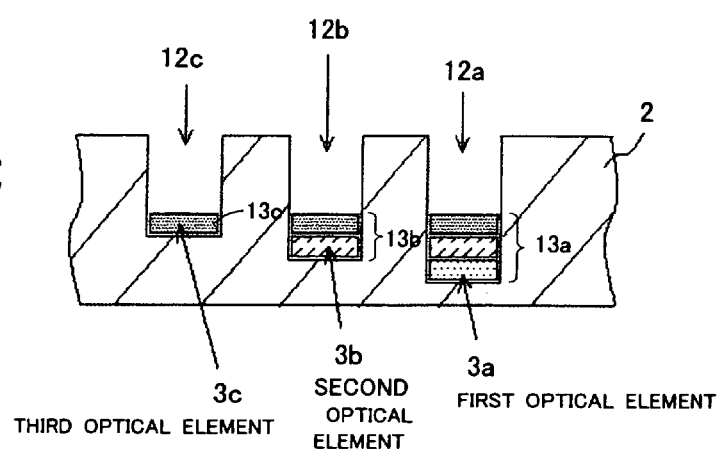
FIG. 4C is an enlarged, schematic cross-sectional view along the line VIB—VIB in FIG. 4A, showing the assembled structure of the optical members and the casing of the backlight unit according to the first embodiment of the invention.

FIG. 2 is an exploded perspective view of the backlight unit 1 according to the first embodiment. FIG. 3 is a schematic front view showing the structure of the optical elements of the unit 1. FIG. 4A is a schematic front view showing the structure of the casing of the unit 1. FIG. 4B is a schematic cross-sectional view along the line VIB—VIB in FIG. 4A. FIG. 4C is an enlarged, schematic cross-sectional view along the line VIB—VIB in FIG. 4A, which shows the assembled structure of the optical members and the casing of the unit 1. FIG. 5A to FIG. 11B are schematic views showing variations of the structure of the optical members and the casing according to the first embodiment, respectively.

Figure 20:
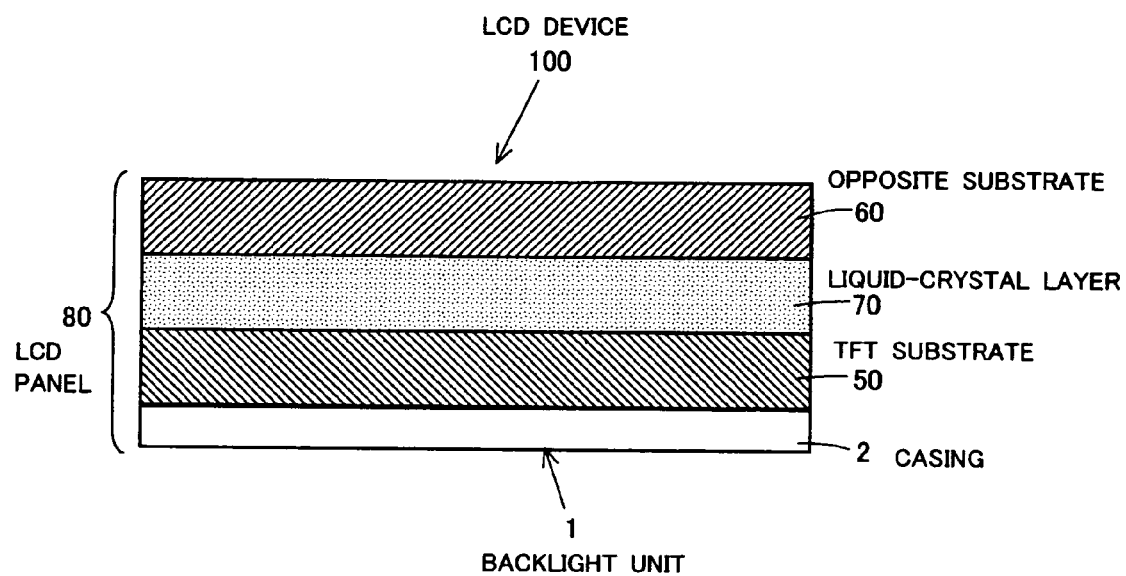
FIG. 20 is a schematic cross-sectional view showing the structure of a LCD device according to the invention, which comprises one of the backlight units according to the first to third embodiments and their variations.

Generally, as shown in FIG. 20, the LCD device 100 according to the first embodiment comprises as its main components a LCD panel 80 and the backlight unit 1 for generating backlight illuminating the panel 80. The panel 80 has a first transparent substrate (e.g., a TFT substrate) 50 on which switching transistors such as Thin-Film Transistors (TFTs) are formed on the respective pixels arranged in a matrix array, a second transparent substrate (e.g., an opposite substrate) 60 on which a color filter and a black matrix are formed, and a liquid-crystal layer 70 sandwiched by the first and second substrates 50 and 60. The backlight unit 1 is fixed adjacent to the first substrate 50 of the panel 80.

As shown in FIG. 2, the backlight unit 1 according to the first embodiment comprises a light source 10 such as a LED (Light-Emitting Diode) for illuminating the LCD panel 80, a circuit section 11 for driving the source 10, a light-guiding plate 4 for guiding the illumination light emitted from the source 10 toward the whole surface of the unit 1, a diffusion sheet 5 for uniformly diffusing the light emitted from the light-guiding plate 4, a first lens sheet 6*a* and a second lens sheet 6*b* for collecting the diffused light to the respective pixels, a polarization sheet 7 for polarizing the collected light, a light-shielding tape 8 for shielding the light entering the periphery of the panel 80, a reflection sheet 9 for reflecting the light emitted from the light-guiding plate 4 to its back toward the panel 80, and a casing 2 for holding these components.

The light-guiding plate 4, the diffusion sheet 5, the first and second lens sheets 6*a* and 6*b*, and the polarization sheet 7, each of which has a rectangular sheet- or plate-like shape and is an optical member with a specific optical function (these members may be simply termed the "optical members 3" below), have protruding parts 13, respectively. Each of the protruding parts 13 of the optical members 3 includes one or more protrusions. The count of the protrusions of each protruding part 13 is defined according to the assembly order of the respective optical members 3. On the other hand, the casing 2 has a depressed part 12 at a corresponding position to the protruding parts 13 of the members 3. The depressed part 12 includes U-shaped notches or depressions. The count of the notches or depressions of the depressed part 12 is equal to the maximum number of the protrusions of all the members 3. The depths of the respective notches of the part 12 in the stacking direction of the members 3, which are different from each other, are respectively defined according to the total thickness of the protrusion or protrusions of the stacked members 3.

As seen from FIG. 20, the panel 80 is held by the casing 2 of the backlight unit 1. The optical members 3 assembled in the casing 2 are fixed by the casing 2 and the opposing surface of the panel 80.

Furthermore, although FIG. 2 shows the case where the light-guiding plate 4, the diffusion sheet 5, the first and second lens sheets 6*a* and 6*b*, and the polarization sheet 7 are used as the optical members 3, the present invention is not limited to this case. It is sufficient for the invention that the backlight unit 1 comprises two or more optical members 3. For example, one diffusion sheet, two lens sheets, and one polarization sheet may be used together without a light-guiding plate. One diffusion sheet, one lens sheet, and one polarization sheet may be used together without a light-guiding plate. One diffusion sheet and one lens sheet may be used together without a polarization sheet. Only two or three diffusion sheets may be used together without lens sheets.

Moreover, in the configuration of FIG. 2, the optical members 3 assembled in the casing 2 are fixed with the LCD panel 80; however, the members 3 may be sandwiched by the casing 2 and another casing (not shown). The feature of the invention exists in the structure of the optical members 3 and that of the casing 2 in which the members 3 are assembled. Therefore, the shape, structure and attitude of the other components than the members 3 and the casing 2, such as the light source 10, the light-shielding tape 8, and the reflection sheet 9, are not limited. Any other type of these components may be used for the invention.

Next, concrete structures of the optical members 3 and the casing 2 will be explained below. In the following explanation, to facilitate the understanding, a case where three optical members 3 (i.e., a first optical member 3a, a second optical member 3b, and a third optical member 3c) are assembled in the casing 2 will be explained as an example.

As shown in FIG. 3, each of the optical members 3 according to the first embodiment comprises one or more protrusions formed on its periphery in the protruding part 13. The count of the protrusions of each member 3 is defined according to its assembly order in the casing 2. For example, the first optical member 3a, which is to be assembled first, has only a first protrusion 13a near the corner. The second optical member 3b, which is to be assembled second, has a second protrusion 13b in addition to a first protrusion 13a. The third optical member 3c, which is to be assembled third, has a third protrusion 13c in addition to a first protrusion 13a and a second protrusion 13b. The first protrusions 13a of the first, second, and third members 3a, 3b and 3c are the same in position, shape and size and therefore, they are entirely overlapped to each other when the members 3a, 3b and 3c are stacked. Similarly, the second protrusions 13b of the second and third members 3b and 3c are the same in position, shape and size and therefore, they are entirely overlapped to each other when the members 3b and 3c are stacked in the casing 2. The second protrusion 13b is apart from the first protrusion 13a at a predetermined distance. The third protrusion 13c is apart from the second protrusion 13b at a predetermined distance.

In the structure of FIG. 3, one protrusion is formed on the first member 3a, two protrusions are formed on the second member 3b, and three protrusions are formed on the third member 3c. This means that the count of the protrusions is increased by one for the second member 3b with respect to the first member 3a, and that it is increased by one for the third member 3c with respect to the second member 3b. However, the invention is not limited to this. It is sufficient for the invention that the count of the protrusions of the optical member 3 to be assembled later is larger than the count of the protrusions of the optical member 3 to be assembled earlier. The count of the protrusions formed on the first member 3a is not limited to one; it may be any number. The number of the protrusions to be added to the second or third member 3b or 3c is not limited to one; it may be any number.

If the front and back, the top and bottom, and/or the left and right of the respective optical members 3 is inverted and assembled in the casing 2, the backlight unit 1 does not operate normally. Thus, to prevent such a false assembly, the protruding part 13 (i.e., the protrusions 13a, 13b, and/or 13c) is located on the upper edge or portion of each member 3 near its one corner. However, the invention is not limited to this. The part 13 may be located at any other position if it is shifted from the center of the edge on which the part 13 is formed.

The casing 2 according to the first embodiment has the structure as shown in FIG. 4A. Specifically, the casing 2 is formed by a rectangular frame. The inner periphery of the frame (i.e., the casing 2) is slightly larger than the outer periphery of the optical members 3. To prevent the assembled members 3 from falling through the casing 2, the bottom of the frame or casing 2 is slightly narrowed with respect to the outer periphery of the members 3. The casing 2 has the first, second, and third U-shaped notches 12a, 12b, and 12c in the depressed part 12. The first, second, and third notches 12a, 12b, and 12c are formed at the corresponding positions to the first, second, and third protrusions 13a, 13b, and 13c of the members 3, respectively. The protrusions 13a, 13b, and 13c can be inserted into the corresponding notches 12a, 12b, and 12c. The protrusions 13a, 13b, and 13c may be fittingly or loosely engaged with the corresponding notches 12a, 12b, and 12c. As shown in FIG. 4B, the notches 12a, 12b, and 12c are different in depth according to the stacking state of the protrusions 13a, 13b, and 13c.

Concretely speaking, the first optical member 3a to be assembled first comprises the first protrusion 13a only and therefore, the depth of the first notch 12a (which is formed at the corresponding position to the first protrusion 13a) is at the maximum. The depth of the first notch 12a is defined in such a way that the first member 3a assembled in the casing 2 is contacted with the bottom of the casing 2. Since the second optical member 3b to be assembled second comprises the first protrusion 13a and the second protrusion 13b, the depth of the second notch 12b (which is formed at the corresponding position to the second protrusion 13b) is less than the depth of the first notch 12a by a value substantially equal to the thickness of the first member 3a. Similarly, since the third optical member 3c to be assembled third comprises the first protrusion 13a, the second protrusion 13b, and the third protrusion 13c, the depth of the third notch 12c (which is formed at the corresponding position to the third protrusion 13c) is less than the depth of the second notch 12b by a value substantially equal to the thickness of the second member 3b.

When the first to third optical members 3a, 3b, and 3c are assembled in the casing 2 in this order, the protrusions 13a, 13b, and 13c of the members 3a, 3b, and 3c are respectively inserted into the corresponding notches 12a, 12b, and 12c, as shown in FIG. 4C. Specifically, the first protrusions 13a of the first to third members 3a, 3b, and 3c are stacked in the first notch 12a with approximately no gap. Similarly, the second protrusions 13b of the second and third members 3b and 3c are stacked in the second notch 12b with approximately no gap. The third protrusion 13c of the third member 3c is placed in the third notch 12c with approximately no gap.

If some of the optical members 3 are mistakenly assembled in the casing 2 due to false order, this mistake can be easily found in the following way. For example, if the second optical member 3b is mistakenly assembled first in the casing 2 instead of the first optical member 3a, the first and second protrusions 13a and 13b of the member 3b are respectively inserted and engaged in the first and second notches 12a and 12b. Since the depth of the second notch 12b is less than the first notch 12a by the value approximately equal to the thickness of the first member 3a, the assembled second member 3b is in a floating state from the bottom of the frame-shaped casing 2. Therefore, by visually checking whether or not the assembled member 3 is in a floating state from the bottom of the casing 2 or from the other member 3 assembled formerly, the rightness of the assembly order of the said member 3 can be recognized easily.

As explained above, with the backlight unit 1 according to the first embodiment, each of the protruding parts 13 of the optical members 3 (3a, 3b, and 3c) includes the protrusions 13a, 13b, and/or 13c whose counts are changed according to their assembly order in the casing 2. At the same time, the depressed part 12 of the casing 2 includes the notches or depressions 12a, 12b, and 12c whose depths are changed according to the stacking state of the members 3

(3a, 3b, and 3c). As a result, the optical members 3 (3a, 3b, and 3c) can be assembled in the casing 2 in a right order and with their right attitude.

Figure 5A:
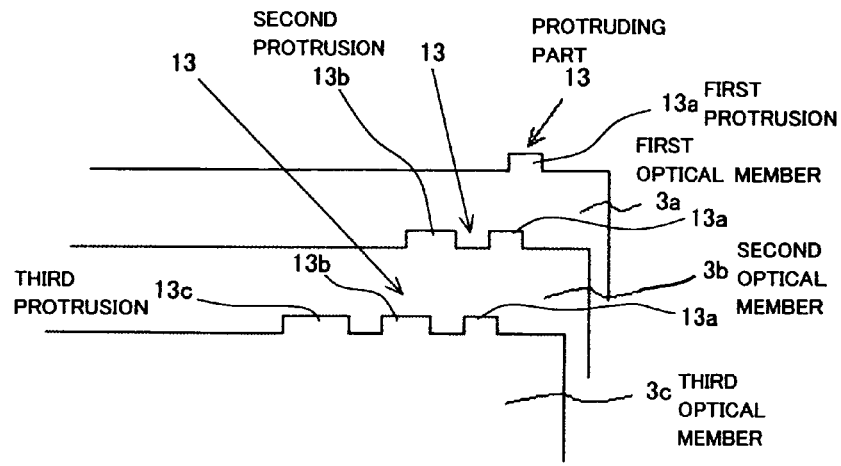
FIGS. 5A to 5C are partial schematic views showing variations of the structure of the optical members of the backlight unit according to the first embodiment of the invention, respectively.
Figure 5B:
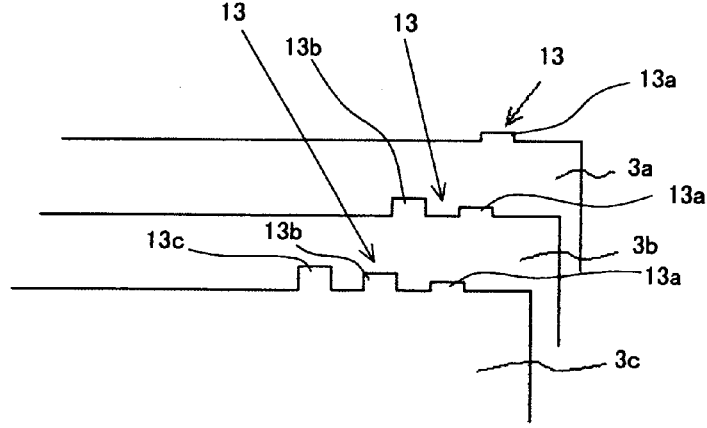
Figure 5C:
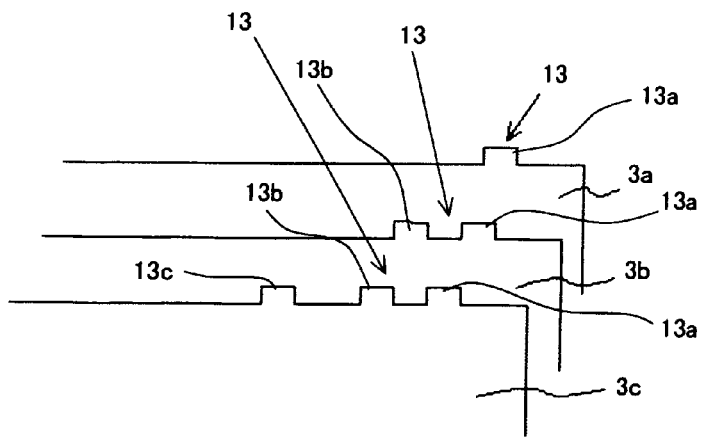

In addition, the shape, size, and interval of the protrusions formed in the protruding part 13 of each optical member 3 are not limited to the concrete structures explained here. If the protrusions belonging in the same group (e.g., the first protrusions 13a of the first to third members 3a, 3b, and 3c) are formed at the same position with the same size and same shape, any modification is possible. For example, as shown in FIG. 5A, the width of the protrusions may be changed. As shown in FIG. 5B, the length (height) of the protrusions in the protruding direction may be changed. As shown in FIG. 5C, the interval of the adjoining protrusions on the same member 3 may be changed. In any one of these modifications, the width, length or interval of all or part of the protruding parts 13 may be changed, and at least two of the width, length and interval of the parts 13 may be simultaneously changed.

Figure 6A:
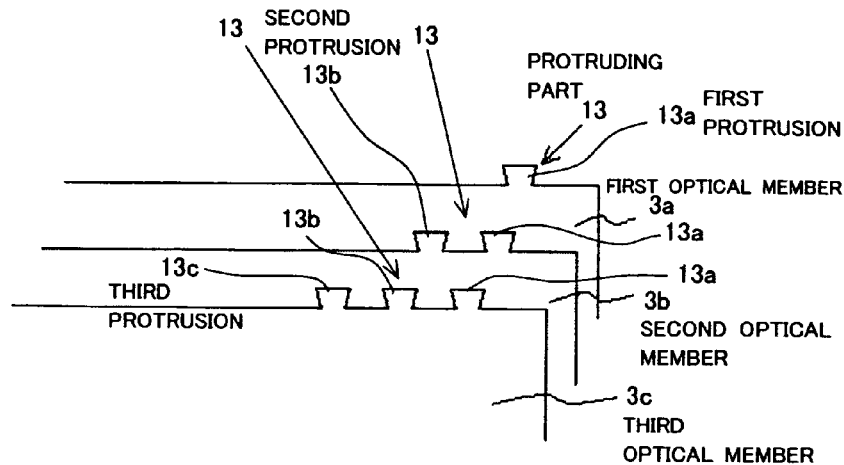
FIGS. 6A to 6C are partial schematic views showing other variations of the structure of the optical members of the backlight unit according to the first embodiment of the invention, respectively.
Figure 6B:
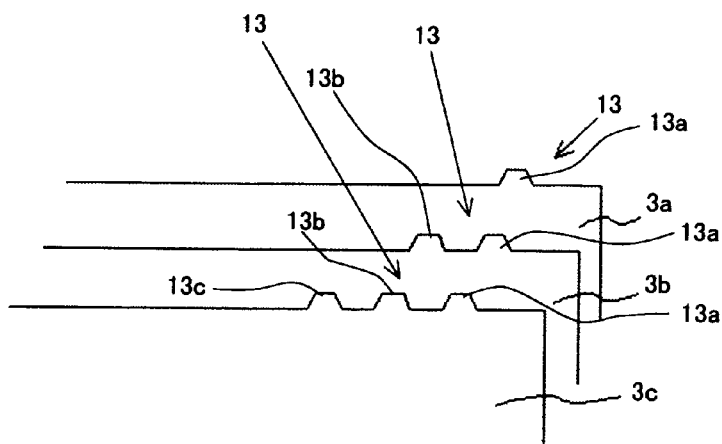
Figure 6C:
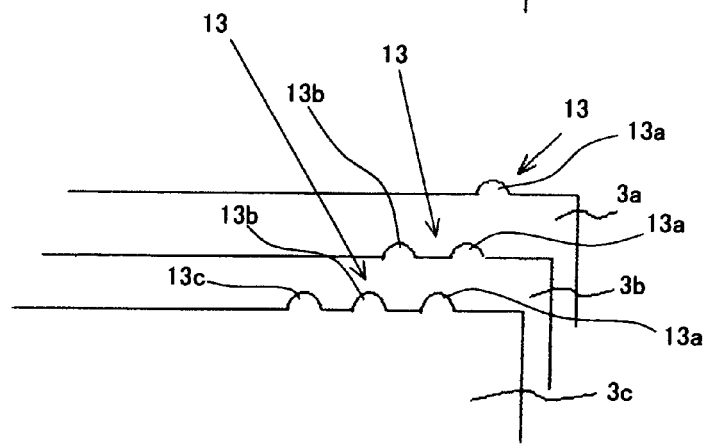

In the structures of FIG. 3 and FIGS. 5A to 5C, all the protrusions 13a, 13b, and 13c of the members 3 formed in the protruding parts 13 are rectangular. However, the shape of the protrusions 13a, 13b, and 13c is not limited to this in the present invention. For example, the protrusions 13a, 13b, and 13c may be of inverted taper where the width of the top is greater than that of the bottom as shown in FIG. 6A, may be tapered where the width of the top is less than that of the bottom as shown in FIG. 6B, or may be circular as shown in FIG. 6C. Furthermore, the protrusions 13a, 13b, and 13c may be of any other shape such as a polygon (e.g., pentagon or hexagon), or a warped shape (e.g., L- or T-like shape). If the protrusions 13a, 13b, and 13c are tapered or circular, there is an additional advantage that the protrusions 13a, 13b, and 13c are easily inserted or engaged in the respective notches 12a, 12b, and 12c of the casing 2. This is because the tapered or rounded regions of the protrusions 13a, 13b, and 13c serve as a guide. If the protrusions 13a, 13b, and 13c are of inverted taper or polygon or, warped shape, there is an additional advantage that the positioning deviation of the protrusions 13a, 13b, and 13c is prevented and that the protrusions 13a, 13b, and 13c are difficult to be removed from the casing 2.

Figure 7A:
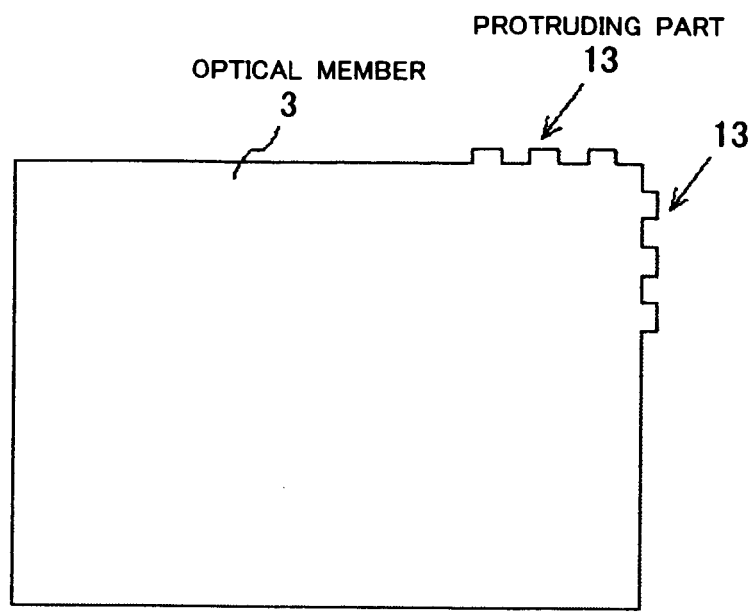
FIGS. 7A and 7B are schematic views showing other variations of the structure of the optical members of the backlight unit according to the first embodiment of the invention, respectively.
Figure 7B:
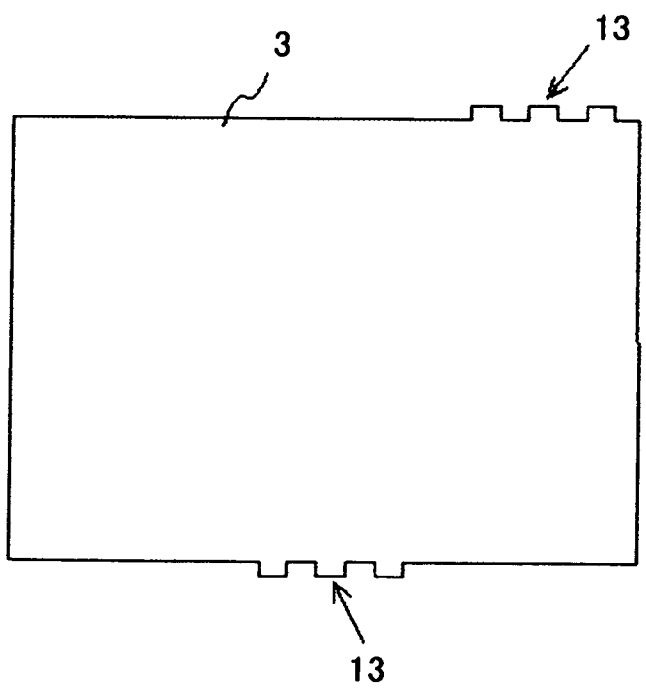

Furthermore, in the structures of FIG. 3, FIGS. 5A to 5C, and FIGS. 6A to 6C, the protruding part 13 is formed on the upper edge of each of the members 3a, 3b, and 3c. However, the invention is not limited to this structure. It is sufficient for the invention that the protruding part 13 is formed on at least one edge (i.e., at least one position on the periphery) of the member 3 (3a, 3b, or 3c). For example, as shown in FIG. 7A, two protruding parts 13 may be respectively formed on the upper and right edges (i.e., two adjoining edges) of the member 3. As shown in FIG. 7B, two protruding parts 13 may be respectively formed on the upper and lower edges (i.e., two opposing edges) of the member 3. In these two cases, if the protruding parts 13 are respectively located at symmetrical positions with respect to the center of the member 3, the member 3 can be inserted or placed in the depressed part 12 of the casing 2 even if the member 3 is rotated at 180° from its right attitude. Moreover, if the protruding parts 13 are respectively located at symmetrical positions with respect to the center line of the member 3, the member 3 can be inserted or placed in the depressed part 12 of the casing 2 even if the front and back of the member 3 are inverted. Therefore, it is necessary for the protruding parts 13 to be located at appropriate positions shifted from (or excluding) the symmetrical positions, respectively.

Figure 8A:
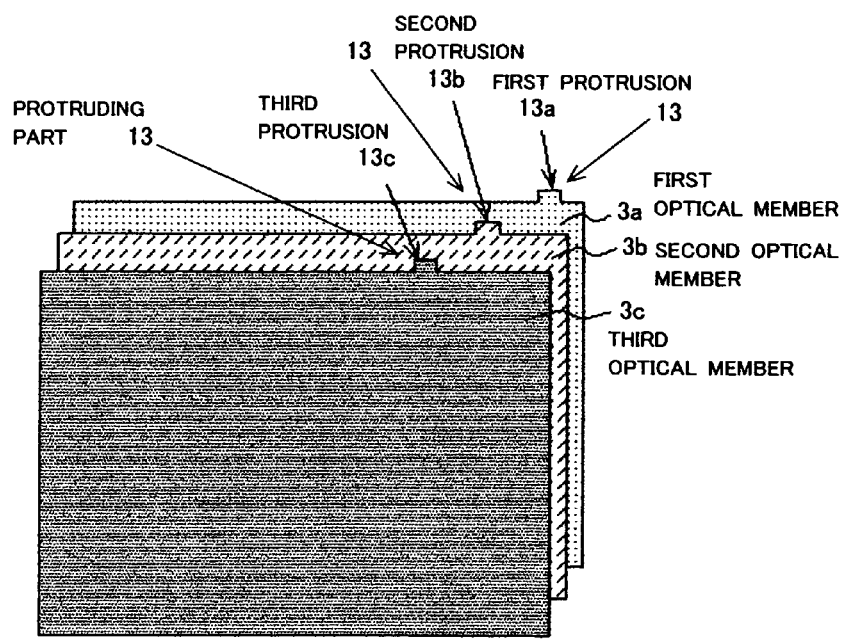
FIG. 8A is a schematic front view showing a further variation of the structure of the optical elements of the backlight unit according to the first embodiment of the invention.
Figure 8B:
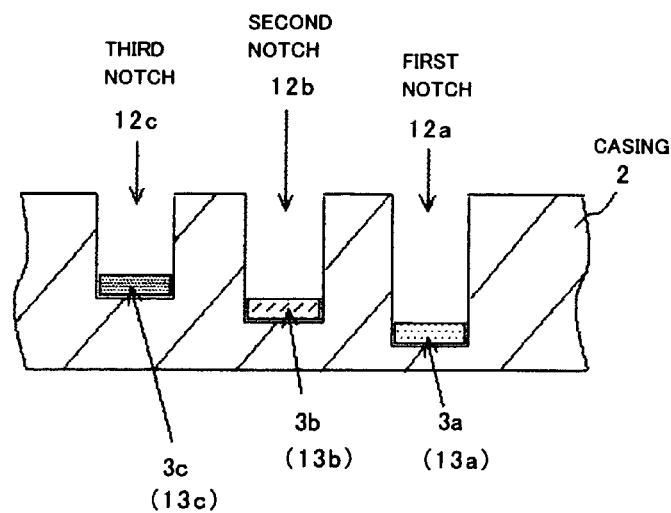
FIG. 8B is an enlarged, schematic cross-sectional view, showing the assembled structure of the optical members and the casing of the backlight unit in the variation of FIG. 8A.

In the structures of FIG. 3 and FIGS. 4A to 4C, the other protrusion or protrusions is/are added to the member 3 with respect to the member 3 to be assembled formerly. However, the invention is not limited to this. For example, as shown in FIG. 8A, when the first protrusion 13a is formed on the first member 3a, only the second protrusion 13a may be formed on the second member 3b, and only the third protrusion 13c may be formed on the third member 3c. This means that the first to third protrusions 13a, 13b, and 13c may be respectively formed on the first to third members 3a, 3b, and 3c at different positions. In this case, if the members 3a, 3b, and 3c are assembled in the casing 2 having the depressed part 12 as shown in FIGS. 4A to 4C, the first to third protrusions 13a, 13b, and 13c are respectively placed or engaged in the first to third notches 12a, 12b, and 12c, as shown in FIG. 8B. If one of the members 3 (3a, 3b, or 3c) is mistakenly assembled in the casing 2, it will be in a floating state from the bottom of the frame-shaped casing 2 or from the other member 3 assembled formerly. Therefore, the rightness of the assembly order of the said member 3 can be recognized easily in these variations also.

Figure 9:
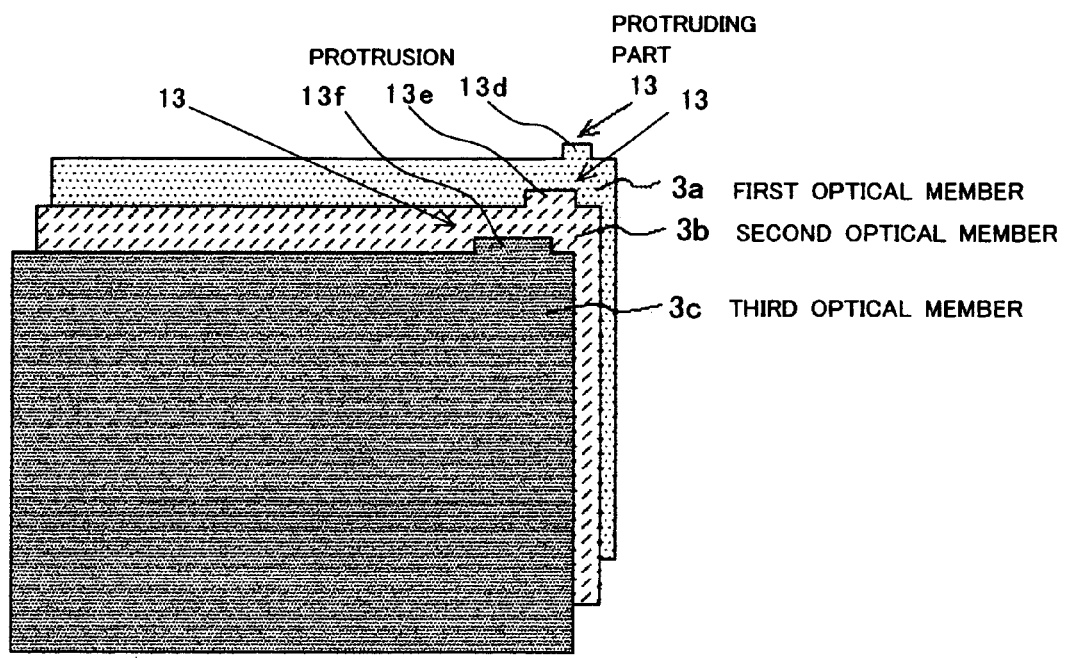
FIG. 9 is a schematic front view showing a still further variation of the structure of the optical elements of the backlight unit according to the first embodiment of the invention.
Figure 10A:
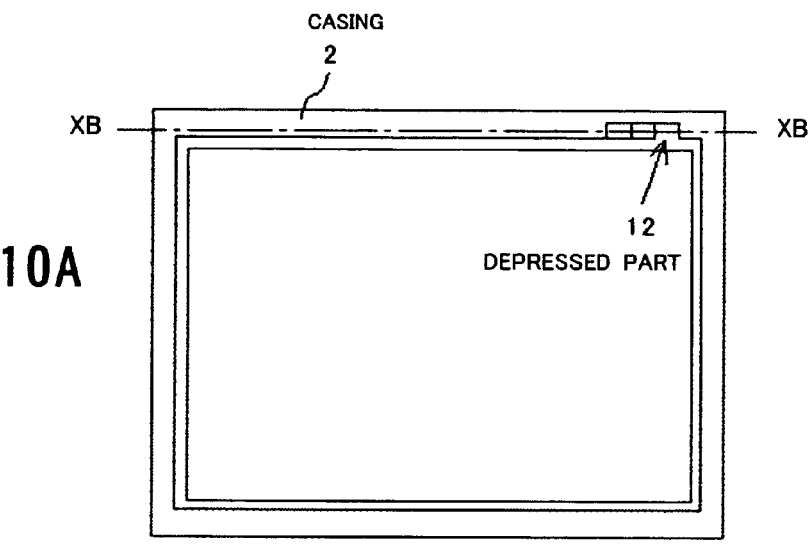
FIG. 10A is a schematic front view showing a still further variation of the structure of the casing of the backlight unit according to the first embodiment.
Figure 10B:
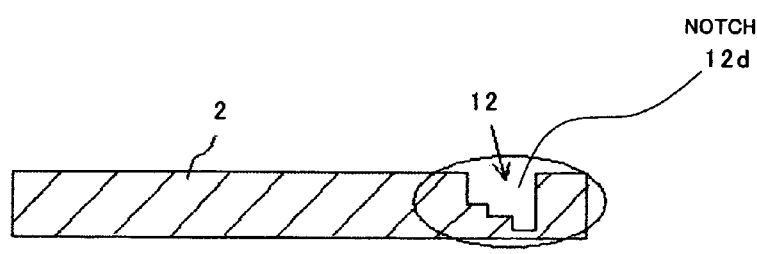
FIG. 10B is a schematic cross-sectional view along the line XB—XB in FIG. 10A.
Figure 10C:
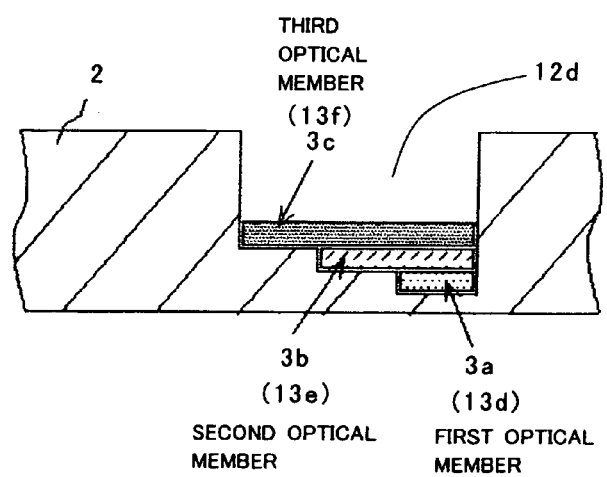
FIG. 10C is an enlarged, schematic cross-sectional view along the line XB—XB in FIG. 10A, showing the assembled structure of the optical members and the casing of the backlight unit in the variation of FIG. 10A.

In the structures of FIG. 3 to FIGS. 6A to 6C, the count of the protrusions formed in each protruding part 13 is increased according to the assembly order. However, the invention is not limited to these structures. For example, to obtain the same advantages, the width of the protrusion formed in each protruding part 13 may be increased according to the assembly order, as shown in FIG. 9. In this case, the depressed part 12 of the casing 2 may be formed as a step-like notch 12d, as shown in FIGS. 10A and 10B. The depths of the notch 12d at corresponding positions to the respective protrusions 12a, 12b, and 12c are changed according to the stacking state of the members 3a, 3b, and 3c. When the members 3a, 3b, and 3c each having the protrusions 13d, 13e, and 13f of FIG. 9 are assembled in the casing 2 having the notch 12d of FIGS. 10A and 10B, the narrowest protrusion 13d of the first member 3a is placed on the deepest region of the notch 12d, as shown in FIG. 10C. The middle-sized protrusion 13e of the second member 3b is placed on the member 3a and the middle-sized region of the notch 12d. The widest protrusion 13f of the third member 3c is placed on the member 3b and the shallowest region of the notch 12d. In this case also, if one of the members 3 (3a, 3b, or 3c) is mistakenly assembled in the casing 2, it will be in a floating state from the bottom of the frame-shaped casing 2 or from the other member 3 assembled formerly. Therefore, the rightness of the assembly order of the members 3 can be recognized easily.

Figure 11A:
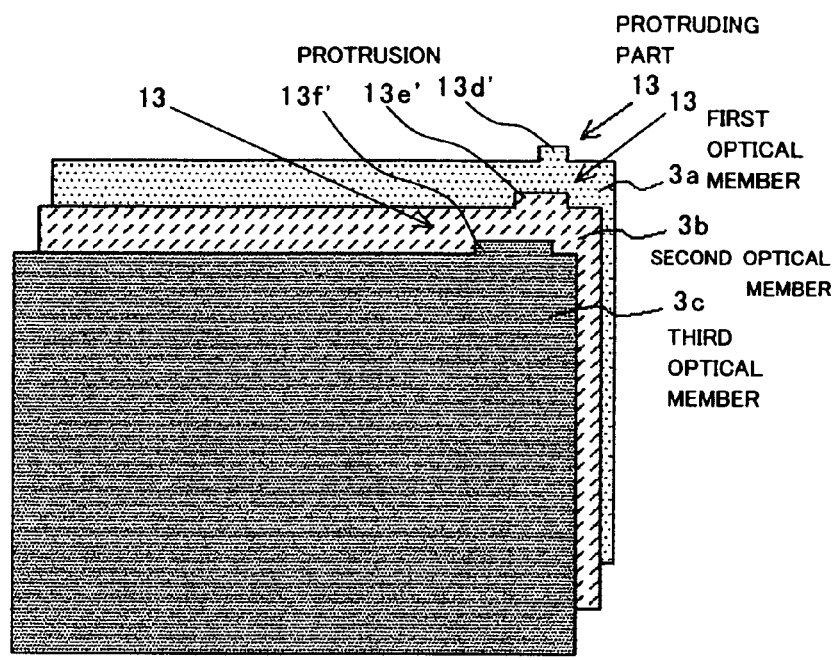
FIG. 11A is a schematic front view showing a still further variation of the structure of the optical elements of the backlight unit according to the first embodiment of the invention.
Figure 11B:
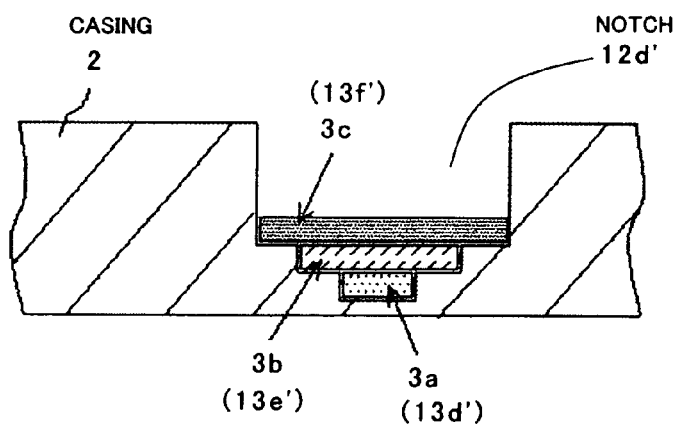
FIG. 11B is an enlarged, schematic cross-sectional view, showing the assembled structure of the optical members and the casing of the backlight unit in the variation of FIG. 11A.

In the structure of FIGS. 10A to 10C, the depressed part 12 (i.e., the notch 12d) is formed like steps in such a way that the depth of the notch 12d is stepwise decreased from the right end to the left end. However, the invention is not limited to this. It is sufficient for the invention that the depressed part 12 includes a plurality of regions with different depths. For example, as shown in FIG. 11A, the protrusions 13d', 13e', and 13f' may be respectively formed on the members 3a, 3b, and 3c in such a way as to be stepwise widened while keeping their centers at the same position. In this case, as shown in FIG. 11B, the depressed part 12 is formed like steps in such a way that the depth of the notch 12d' is stepwise increased from each end to the center. When the members 3a, 3b, and 3c are assembled in the casing 2, the protrusion 13d' is placed on the deepest region of the notch 12d', the protrusion 13e' is placed on the protrusion 13d' and the middle-sized region of the notch 12d', and the protrusion 13f' is placed on the protrusion 13e' and the widest region of the notch 12d'.

As explained above in detail, with the backlight unit 1 according to the first embodiment and its variations, each of the optical members 3 has the protruding part 13 that includes at least one protrusion. The count, width, interval, and/or shifted distance of the at least one protrusion is/are changed according to the assembly order of the members 3 in the casing 2. The casing 2 has the depressed part 12 having a depth or depths varied according to the stacking state of the protrusions of the members 3. Accordingly, even if some of the members 3 are mistakenly assembled in the casing 2 due to false order and/or false attitude, this mistake can be easily found. As a result, malfunction can be prevented from occurring in the assembling stage of the backlight 1.

SECOND EMBODIMENT

Next, a backlight unit and a LCD device with the unit according to a second embodiment of the invention will be explained with reference to FIGS. 12A to 15B.

Figure 12A:
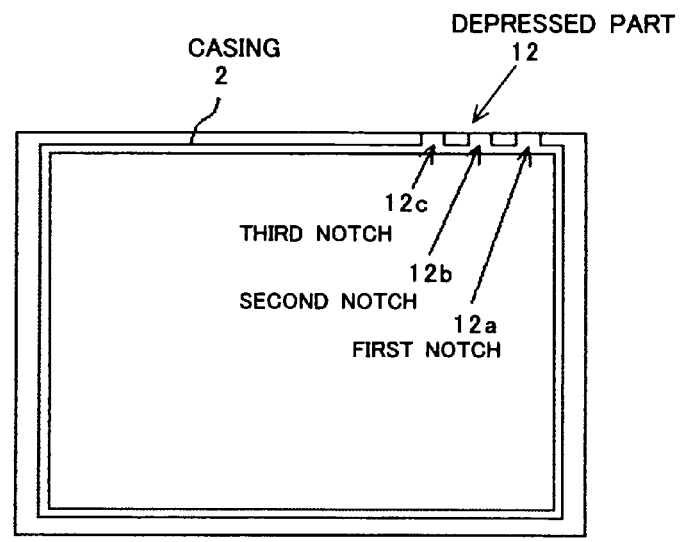
FIG. 12A is a schematic front view showing the structure of the casing of the backlight unit according to a second embodiment of the invention.
Figure 12B:
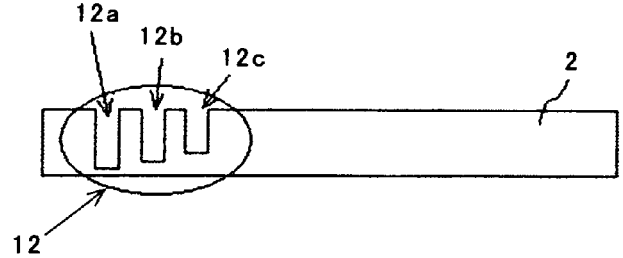
FIG. 12B is a plan view of the structure of FIG. 12A seen from the outside of the casing.
Figure 12C:
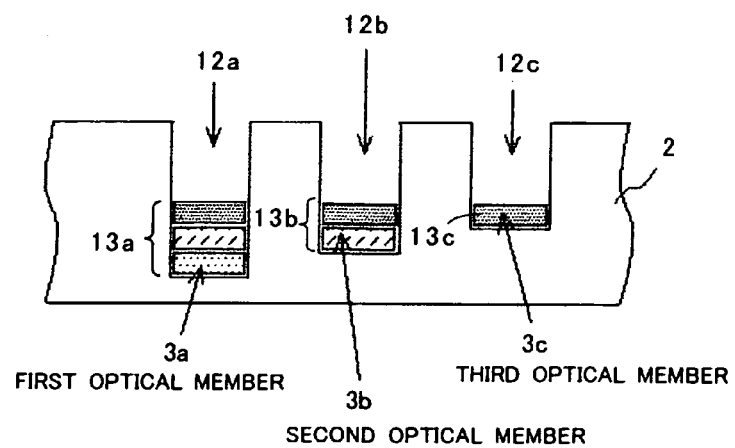
FIG. 12C is an enlarged, schematic plan view of the structure of FIG. 12A, showing the assembled structure of the optical members and the casing of the backlight unit according to the second embodiment of the invention.

FIG. 12A is a schematic front view showing the structure of the casing of the backlight unit according to the second embodiment. FIG. 12B is a schematic plan view of the casing, which is seen from the outside of the casing. FIG. 12C is an enlarged, schematic cross-sectional view similar to FIG. 4C, which shows the assembled structure of the optical members and the casing of the backlight unit according to the second embodiment. FIGS. 14A to 14C and FIGS. 15A and 15B are schematic views showing variations of the structure according to the second embodiment, respectively.

With the above-described backlight unit 1 according to the first embodiment of the invention, the depressed part 12 of the casing 2 is formed by eliminating a desired part of the inner wall of the casing 2. In this structure, the order of the assembled optical members 3 in the casing 2 is unable to be confirmed after the assembly operation of the backlight unit 1 is completed. Accordingly, in the second embodiment of the invention, to make it possible to confirm the arrangement of the members 3 in the casing 2 even after the assembly operation of the backlight unit 1 is completed, depressions or openings 12a 12b, and 12c are formed to penetrate from the inside of the casing 2 to the outside thereof.

In the following explanation, similar to the first embodiment, a case where three optical members 3 (i.e., a first optical member 3a, a second optical member 3b, and a third optical member 3c) are assembled in the casing 2 will be explained as an example.

As shown in FIG. 12A, the rectangular frame-shaped casing 2 according to the second embodiment comprises a depressed part 12 in its upper portion. The part 12 includes first, second, and third U-shaped notches 12a, 12b, and 12c located at intervals along the upper portion of the casing 2. These notches 12a, 12b, and 12c are formed to penetrate through the upper portion from the inside of the casing 2 to the outside thereof. The notches 12a, 12b, and 12c have different depths according to the stacking state of the first, second, and third optical members 3a, 3b, and 3c, as shown in FIG. 12B.

The first, second, and third optical members 3a, 3b, and 3c used in the second embodiment have the same structures as those used in the above-described first embodiment shown in FIG. 3.

When the members 3a, 3b, and 3c are assembled in the casing 2, the first protrusions 13a of the first to third members 3a, 3b, and 3c are stacked in the first notch 12a, the second protrusions 13b of the second and third members 3b and 3c are stacked in the second notch 12b, and the third protrusion 13c of the third member 3c is placed in the third notch 12c, as shown in FIG. 12C.

With such the structure according to the second embodiment also, if one of the members 3 (3a, 3b, or 3c) is mistakenly assembled in the casing 2, it will be in a floating state from the bottom of the frame-shaped casing 2 or from the other member 3 assembled formerly, like the first embodiment. Therefore, the rightness of the assembly order of the members 3 can be recognized easily.

Moreover, in the first embodiment, for example, if the first optical member 3a and two of the second optical members 3b are assembled in the casing 2 instead of assembling the first to third optical members 3a, 3b, and 3c one by one, all the members 3a and 3b can be assembled. Thus, false assembly is unable to be found in the first embodiment after the assembly operation is completed. Unlike this, in the second embodiment, the first to third notches 12a, 12b, and 12c are formed to penetrate through the upper portion of the frame-shaped casing 2 and therefore, the first to third protrusions 13a, 13b, and 13c can be visually recognized from the outside of the casing 2. As a result, there is an additional advantage that the order and attitude of the assembled optical members 3 (3a, 3b, and 3c) can be confirmed from the appearance of the backlight unit after completing the assembling operation of the unit.

Figure 13A:
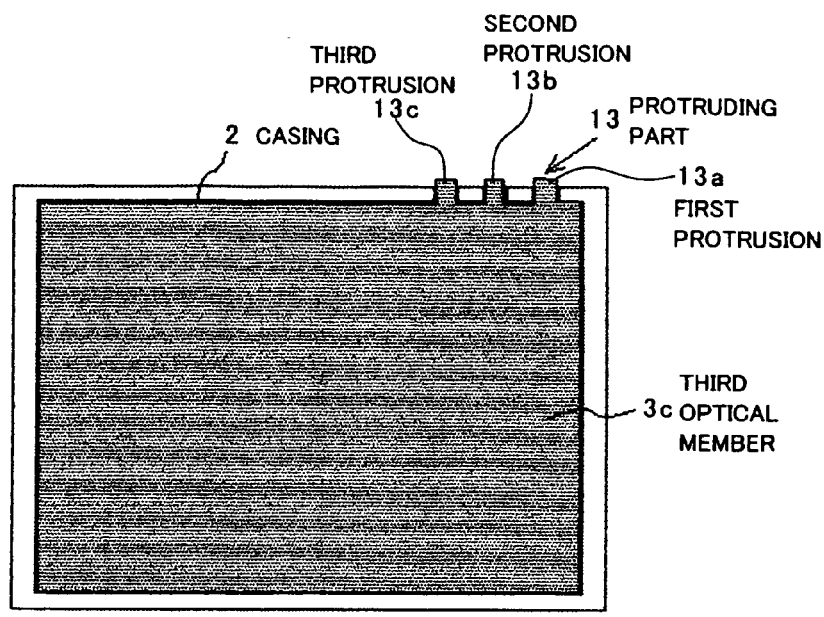
FIG. 13A is a schematic rear view showing the structure of the backlight unit in a variation of the second embodiment of the invention.
Figure 13B:
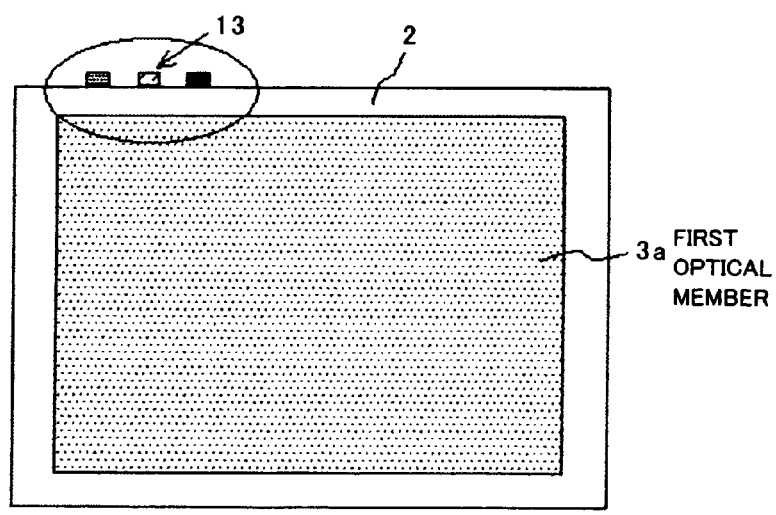
FIG. 13B is a schematic front view showing the structure of the backlight unit in the variation of FIG. 13A.
Figure 13C:
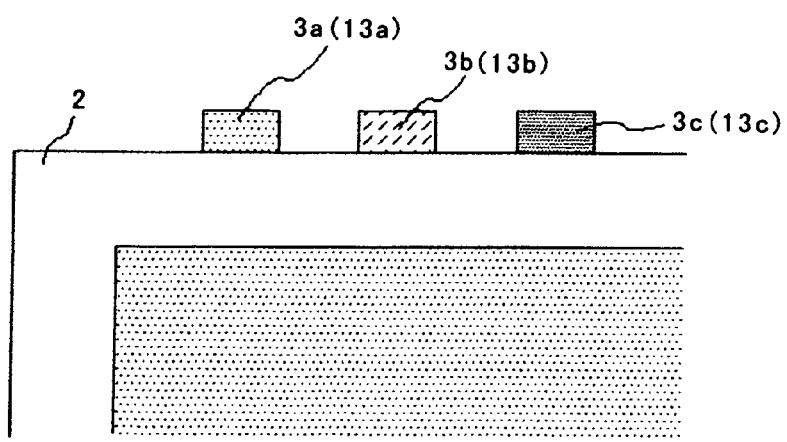
FIG. 13C is an enlarged, partial, schematic front view of the structure of FIG. 13A, showing the assembled structure of the optical members and the casing of the backlight unit in the variation of FIG. 13A.

In the second embodiment, each of the protrusions 13a, 13b, and 13c of the members 3 may be formed to be buried in the notches 12a, 12b, and 12c, respectively. However, as shown in FIG. 13A, each of the protrusions 13a, 13b, and 13c may have a height or length greater than the thickness of the upper portion of the casing 2. In this case, as shown in FIGS. 13B and 13C, the protrusions 13a, 13b, and 13c of the members 3a, 3b, and 3c stick out of the notches 12a, 12b, and 12c, respectively. Thus, when viewing from the back of the backlight unit, the top ends of the protrusions 13a, 13b, and 13c placed outside the casing 2 are clearly seen. This means that there is an additional advantage that whether the assembled optical members 3 (3a, 3b, and 3c) are right or not can be easily confirmed at a glance.

In addition, the confirmation of the assembled optical members 3 may be visually conducted. However, if pictures of the depressed part 12 are taken with a CCD (Charge-Coupled Device) camera or the like and then, the pictures are subjected to appropriate image processing to thereby detect the top ends of the protrusions 13a, 13b, and 13c, the post-assembly inspection of the backlight unit can be carried out more easily and more surely.

It is preferred that the top ends of the protrusions 13a, 13b, and 13c sticking out of the casing 2 are cut down along the surface of the casing 2 after the post-assembly inspection is completed. This cutting operation may be carried out by hand or by appropriate cutting means provided in the inspection apparatus. If the post-assembly inspection and the cutting operation of the top ends of the protrusions 13a, 13b, and 13c are automatically conducted, there is an additional advantage that the assembling operation of the backlight unit can be conducted rapidly and efficiently.

Figure 14A:
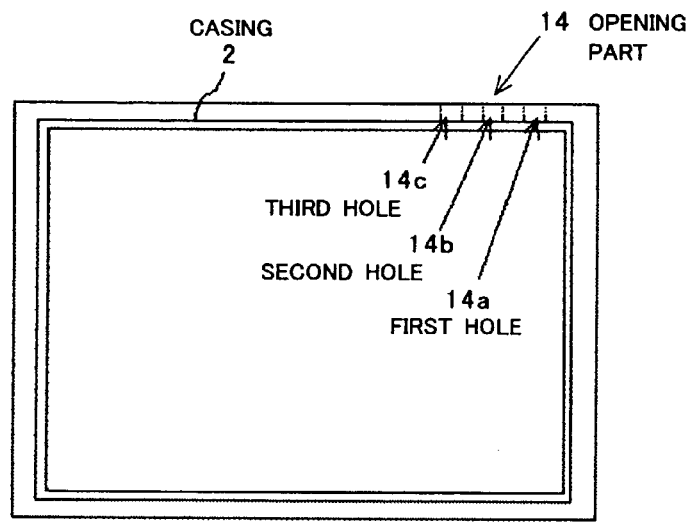
FIG. 14A is a schematic front view showing the structure of the casing of the backlight unit in another variation of the second embodiment of the invention.
Figure 14B:
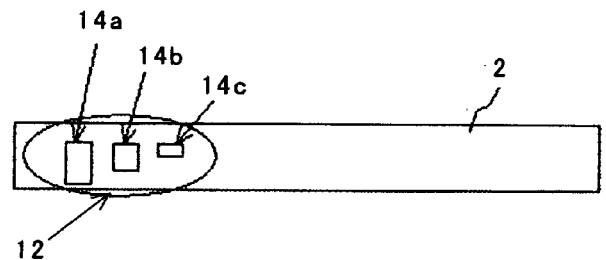
FIG. 14B is a plan view of the structure of FIG. 14A seen from the outside of the casing.
Figure 14C:
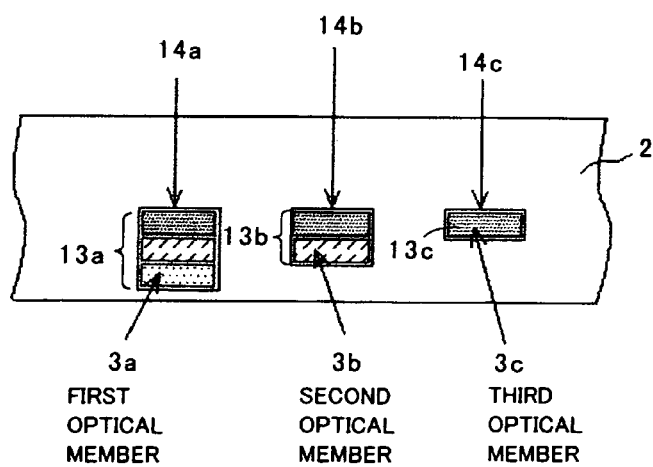
FIG. 14C is an enlarged, partial, schematic plan view of the structure of FIG. 14B, showing the assembled structure of the optical members and the casing of the backlight unit in the variation of FIG. 14A.

In the structures of FIGS. 12A to 12C and FIGS. 13A to 13C, the protrusions 13a, 13b, and 13c of the members 3a, 3b, and 3c are respectively inserted into the notches 12a, 12b, and 12c through their opening ends. In these structures, when the casing 2 is turned upside down, there is a problem that the assembled members 3a, 3b, and 3c are likely to depart from the casing 2. Accordingly, as shown in FIGS. 14A to 14C, an opening part 14 may be formed on the casing 2, where the part 14 includes a first hole 14a, a second hole 14b, and a third hole 14c formed at intervals. These holes 14a, 14b, and 14c penetrate through the upper portion of the casing 2. The depths of the holes 14a, 14b, and 14c are different from each other according to the stacking state of the protrusions 13a, 13b, and 13c. The first protrusions 13a of the first to third members 3a, 3b, and 3c are stacked and inserted into the first hole 14a. The second protrusions 13b and 13c of the second and third members 3b and 3c are stacked and inserted into the second hole 14b. The third protrusion 13c of the third member 3c is inserted into the third hole 14c.

With the structures of FIGS. 14A to 14C, workability will be lower compared with the structures of FIGS. 12A to 12C or FIGS. 13A to 13C. However, there is an additional advantage that unforeseen departure of the assembled members 3a to 3c from the casing 2 is prevented. Moreover, when all the members 3a to 3c are rightly assembled in the casing 2, the first to third holes 14a, 14b, and 14c are respectively occupied or closed with at least one of the protrusions 13a, 13b, and 13c. Thus, there is another additional advantage that whether the assembled members 3a to 3c are right or not can be judged more easily.

Figure 15A:
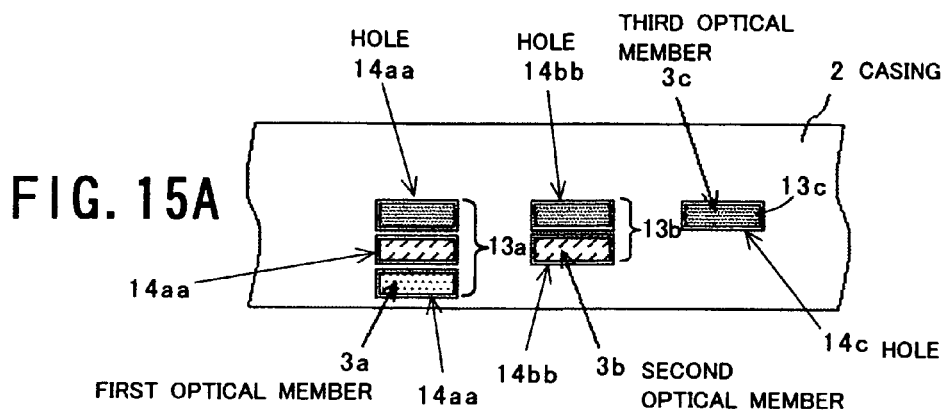
FIG. 15A is an enlarged, partial, schematic plan view of the structure in a still another variation of the second embodiment of the invention, showing the assembled structure of the optical members and the casing of the backlight unit.

Moreover, with the structures of FIGS. 14A to 14C, three of the first protrusions 13a of the first to third members 3a to 3c, which are located at the same position, are inserted into the first hole 14a. Similarly, two of the second protrusions 13b of the second and third members 3b and 3c, which are located at the same position, are inserted into the second hole 14b. The third protrusion 13c of the third member 3c is inserted into the third hole 14c. However, the invention is not limited to this case. For example, as shown in FIG. 15A, three of the first protrusions 13a of the first to third members 3a to 3c may be respectively inserted into three separate or isolated holes 14aa, and two of the second protrusions 13a of the second and third members 3b and 3c may be respectively inserted into two separate or isolated holes 14bb.

Figure 15B:
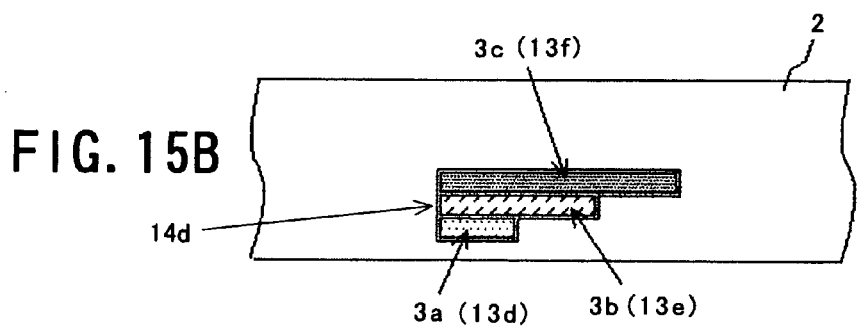
FIG. 15B is an enlarged, partial, schematic plan view of the structure in a further variation of the second embodiment of the invention, showing the assembled structure of the optical members and the casing of the backlight unit.

When the first to third members 3a, 3b, and 3c have the structure shown in FIG. 9, where the width of the protrusion 13a formed in each protruding part 13 is increased according to the assembly order, the casing 2 may have a hole 14d as shown in FIG. 15B. The hole 14d is formed stepwise and includes three regions having different depths according to the staking state of the protrusions 13a to 13c. Thus, three of the protrusions 13a (which are different in width) of the members 3a, 3b, and 3c are inserted into the same hole 14d, as shown in FIG. 15B.

With the above-described structures according to the second embodiment and its variations, similar to the first embodiment, the width, length or interval of all or part of the protrusions of the protruding parts 13 may be changed, as shown in FIGS. 5A to 5C, where at least two of the width, length and interval of the protrusions may be simultaneously changed. The shape of the protrusions may be changed to a desired shape, for example, as shown in FIGS. 6A to 6C. Moreover, as shown in FIGS. 7A and 7B, two or more protruding parts 13 may be respectively formed on two or more edges of the member or members 3. As shown in FIG. 8A, the protruding parts 13 (i.e., the protrusions 13a, 13b, and 13c) of the respective members 3 may be respectively formed on the different positions of the members 3.

A LCD device according to the second embodiment comprises as its main components the LCD panel 80 and the backlight unit having one of the above-described structures. The panel 80 is held by the casing 2 of the backlight unit. The optical members 3 assembled in the casing 2 are fixed by the casing 2 and the opposing surface of the panel 80.

THIRD EMBODIMENT

Next, a backlight unit and a LCD device with the unit according to a third embodiment of the invention will be explained with reference to FIG. 16 to FIG. 19C.

Figure 16:
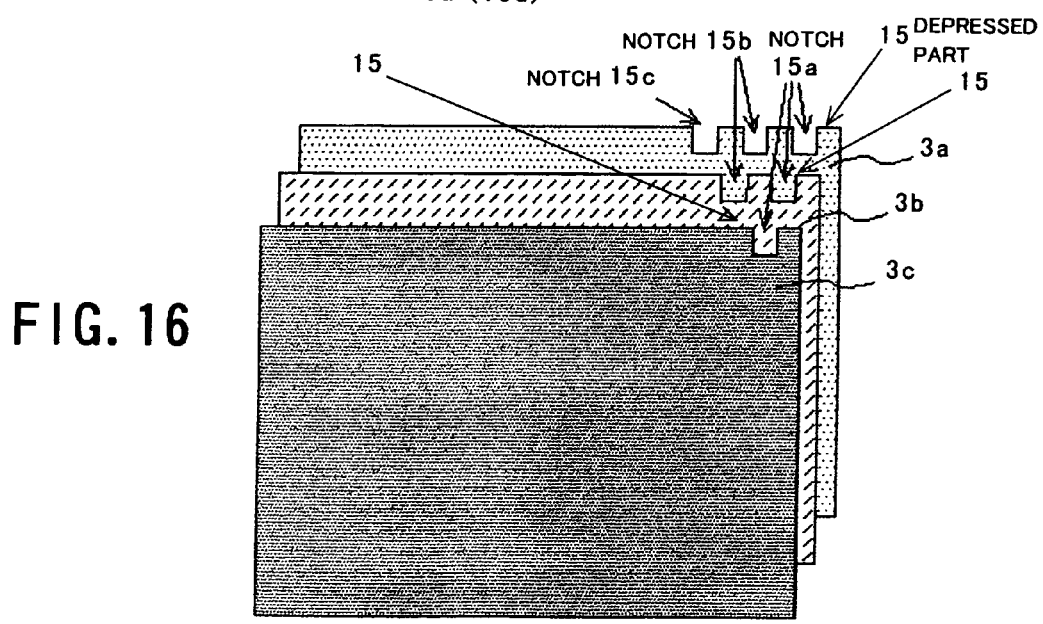
FIG. 16 is a schematic front view showing the structure of the optical elements of the backlight unit according to a third embodiment of the invention.
Figure 17A:
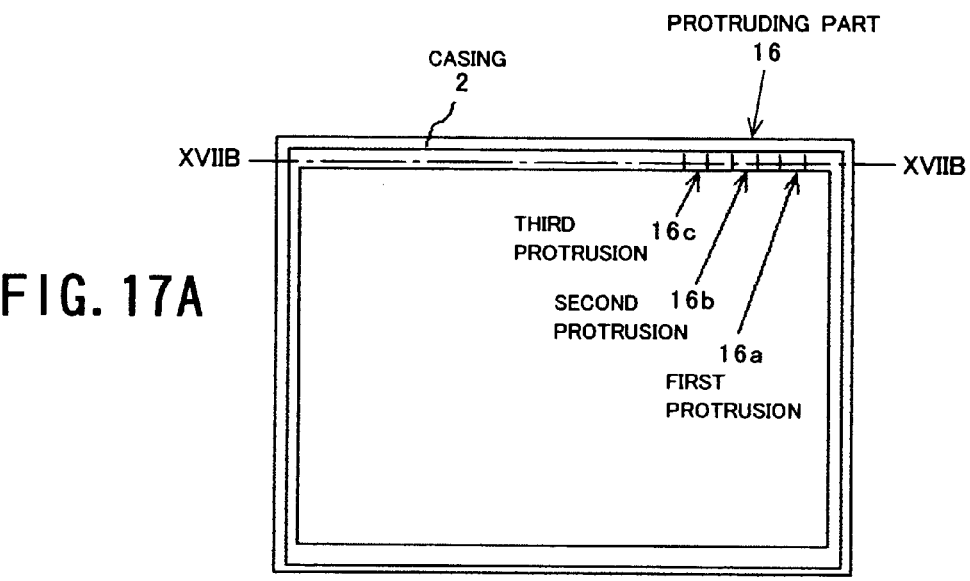
FIG. 17A is a schematic front view showing the structure of the casing of the backlight unit according to the third embodiment of the invention.
Figure 17B:
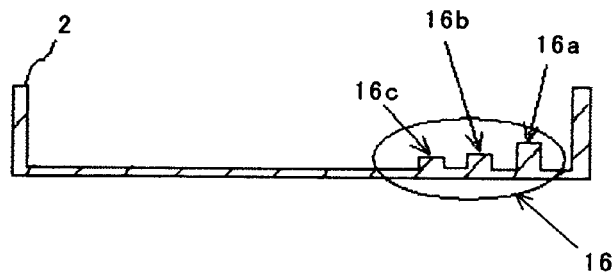
FIG. 17B is a schematic cross-sectional view along the line XVIIB—XVIIB in FIG. 17A.
Figure 17C:
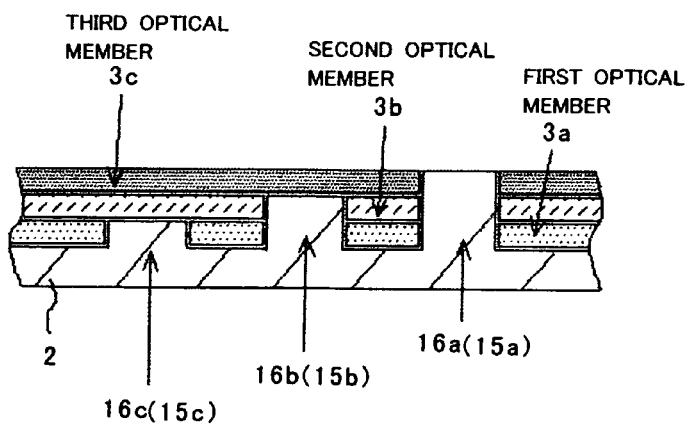
FIG. 17C is an enlarged, partial, schematic cross-sectional view along the line XVIIB—XVIIB in FIG. 17A, showing the assembled structure of the optical members and the casing of the backlight unit according to the third embodiment of the invention.

FIG. 16 is a schematic front view showing the structure of the optical elements of the backlight unit according to the third embodiment. FIG. 17A is a schematic front view showing the structure of the casing of the backlight unit according to the third embodiment. FIG. 17B is a schematic cross-sectional view along the line XVIIB—XVIIB in FIG. 17A. FIG. 17C is an enlarged, partial schematic cross-sectional view along the line XVIIB—XVIIB in FIG. 17A, which shows the assembled structure of the optical members and the casing of the backlight unit according to the third embodiment. FIG. 18 and FIGS. 19A to 19C are schematic views showing variations of the structure according to the third embodiment, respectively.

In the above-described first and second embodiments, the protruding part or parts 13 is/are formed on each of the optical members 3 while the depressed part(s) 12 or hole(s) 14 is/are formed in the casing 2 corresponding to the protruding part(s) 13. Opposite to this, a depressed part or parts may be formed on each of the optical members 3 while a protruding part or parts may be formed in the casing 2 corresponding to the depressed part(s).

In the following explanation, similar to the first and second embodiments, a case where three optical members 3 (i.e., a first optical member 3a, a second optical member 3b, and a third optical member 3c) are assembled in the casing 2 will be explained as an example.

As shown in FIG. 16, each of the optical members 3 according to the third embodiment comprises one or more U-shaped notches formed on its periphery in the depressed part 15. The count of the notches of each member 3 is defined according to its assembly order in the casing 2. For example, the first optical member 3a, which is to be assembled first, has a first notch 15a, a second notch 15b, and a third notch 15c near the corner. The second optical member 3b, which is to be assembled second, has a first notch 15a and a second notch 15b. The third optical member 3c, which is to be assembled third, has only a first notch 15a. The first notches 15a of the first, second, and third members 3a, 3b and 3c are the same in position, shape and size and therefore, they are entirely overlapped to each other when the members 3a, 3b and 3c are stacked. Similarly, the second notches 15b of the second and third members 3b and 3c are the same in position, shape and size and therefore, they are entirely overlapped to each other when the members 3b and 3c are stacked. The second notch 15b is apart from the first notch 15a, and the third notch 15c is apart from the second notch 15b on each of the members 3a, 3b, and 3c.

In the configuration of FIG. 16, three U-shaped notches are formed on the first member 3a, two U-shaped notches are formed on the second member 3b, and one U-shaped notch is formed on the third member 3c. This means that the count of the notches is decreased by one for the second member 3b with respect to the first member 3a, and that it is decreased by one for the third member 3c with respect to the second member 3b. However, the invention is not limited to this case. It is sufficient for the invention that the count of the notches of the optical member 3 to be assembled later is smaller than the count of the notches of the optical member 3 to be assembled earlier. The count of the notches formed on the first member 3a is not limited to three; it may be any number. The number of the notches to be subtracted from the second or third optical member 3b or 3c is not limited to one; it may be any number.

If the front and back, the top and bottom, and/or the left and right of the respective optical members 3 is/are inverted and assembled in the casing 2, the backlight unit does not operate normally. Thus, to prevent such a false assembly, the depressed part 15 (i.e., the notches 15a, 15b, and 15c) is located on the upper edge of each member 3 near its one corner. However, the invention is not limited to this case. The depressed part 15 may be located at any other position if it is shifted from the center of the edge on which the part 15 is formed.

On the other hand, the rectangular frame-shaped casing 2 according to the third embodiment has the structure as shown in FIG. 17A. The casing 2 has the first, second, and third protrusions 16a, 16b, and 16c in the protruding part 16 thereof. The first to third protrusions 16a, 16b, and 16c of the part 16 are respectively formed at the corresponding positions to the first, second, and third notches 15a, 15b, and 15c of the members 3a, 3b, and 3c. As shown in FIG. 17B, the protrusions 16a, 16b, and 16c are different in height with respect to the periphery of the casing 2 according to the stacking state of the notches 15a, 15b, and 15c.

Concretely speaking, each of the first to third optical members 3a, 3b, and 3c comprises the first notch 15a and therefore, the height of the first protrusion 16a (which is formed at the corresponding position to the first notch 15a) is at the maximum. Similarly, each of the first and second optical members 3a and 3b comprises the second notch 15c and therefore, the height of the second protrusion 16b (which is formed at the corresponding position to the second notch 15b) is less than the height of the first protrusion 16a by a value substantially equal to the thickness of the third member 3c. Since only the first optical member 3a comprises the third notch 15c and therefore, the height of the third protrusion 16c (which is formed at the corresponding position to the third notch 15c) is less than the height of the second protrusion 16b by a value substantially equal to the thickness of the second member 3b. The height of the third protrusion 16c is substantially equal to the thickness of the first member 3a.

When the first to third optical members 3a, 3b, and 3c are assembled in the casing 2 in this order, the notches 15a, 15b, and 15c of the members 3a, 3b, and 3c are engaged with the respective protrusions 16a, 16b, and 16c, as shown in FIG. 17C. Specifically, the first notches 15a of the first to third members 3a, 3b, and 3c are stacked and fittingly engaged with the first protrusion 16a. Similarly, the second notches 15b of the first and second members 3a and 3b are stacked and fittingly engaged with the second protrusion 16b. The third notch 15c of the first member 3a is fittingly engaged with the third protrusion 16c.

If some of the optical members 3a, 3b, and 3c is/are mistakenly assembled in the casing 2 due to false order, this mistake can be easily found in the following way. For example, if the second optical member 3b is mistakenly assembled first in the casing 2 instead of the first member 3a, the first and second notches 15a and 15b of the second member 3b are respectively engaged with the first and second protrusions 16a and 16b. Since the second member 3b does not have the third notch 15c, the assembled second member 3b is in a floating state from the bottom of the frame-shaped casing 2 due to the third protrusion 16c. Therefore, by visually checking whether or not the assembled member 3 is in a floating state from the bottom of the casing 2 or from the other member 3 assembled formerly, the rightness of the assembly order of the said member 3 can be recognized easily.

Figure 18:
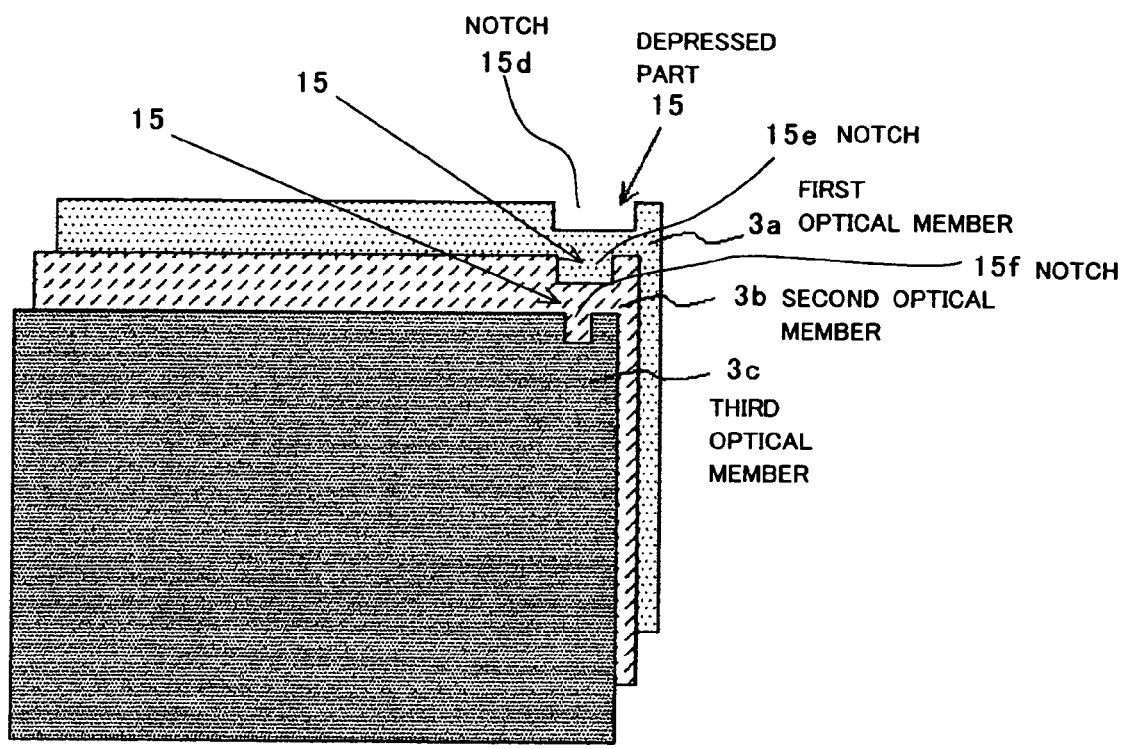
FIG. 18 is a schematic front view showing a variation of the structure of the optical elements of the backlight unit according to the third embodiment of the invention.
Figure 19A:
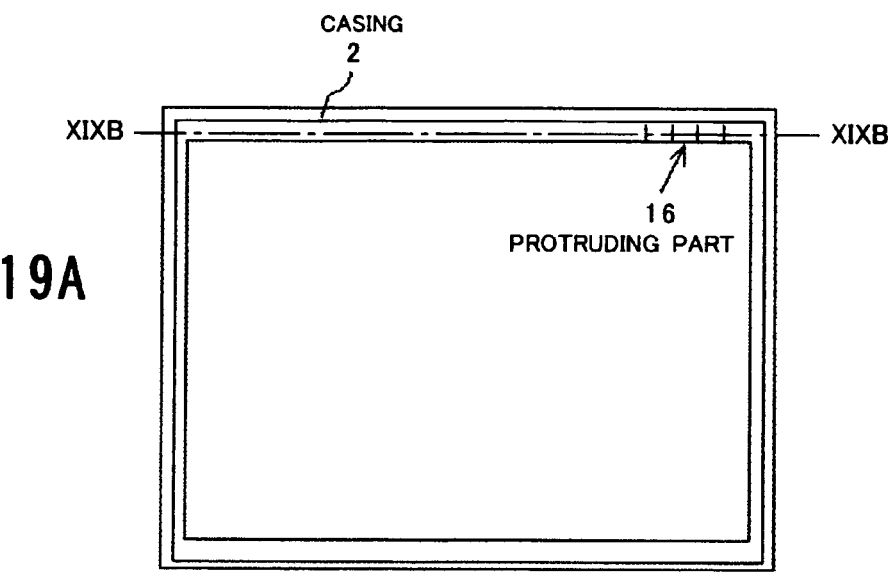
FIG. 19A is a schematic front view showing another variation of the structure of the casing of the backlight unit according to of the third embodiment of the invention.
Figure 19B:
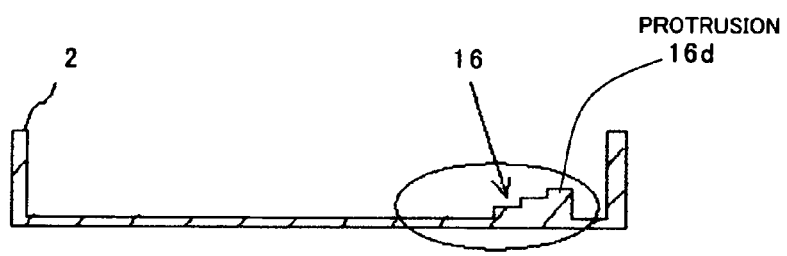
FIG. 19B is a schematic cross-sectional view along the line XIXB—XIXB in FIG. 19A.
Figure 19C:
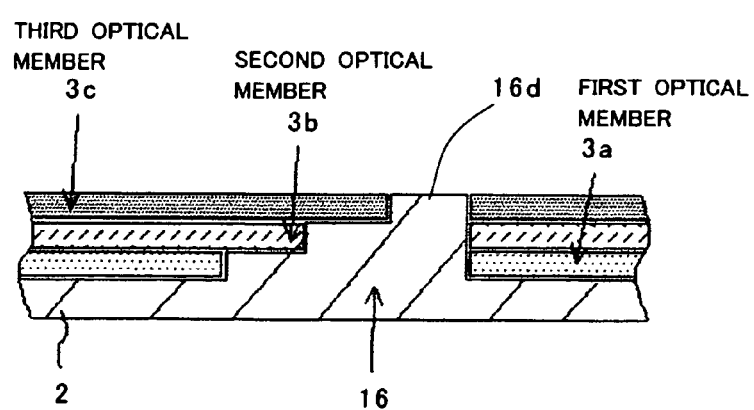
FIG. 19C is an enlarged, partial, schematic cross-sectional view along the line XIXB—XIXB in FIG. 19A, showing the assembled structure of the optical members and the casing of the backlight unit of the variation of FIG. 19A.

Moreover, similar to the first embodiment, the width of the U-shaped notches 15d, 15e, and 15f formed in the depressed parts 15 of the optical members 3a, 3b, and 3c may be decreased according to the assembly order, as shown in FIG. 18. In this case, the protruding part 16 of the casing 2 may be formed as a step-like protrusion 16d, as shown in FIGS. 19A and 19B. The heights of the part 16 at corresponding positions or regions to the respective notches 15d, 15e, and 15f are changed according to the stacking state of the members 3a, 3b, and 3c. When the members 3a, 3b, and 3c each having the notches 15d, 15e, and 15f of FIG. 18 are assembled in the casing 2 having the protruding part 16 of FIGS. 19A and 19B, the notches 15d, 15e, and 15f are engaged with the step-like protrusion 16d of the protruding part 16, as shown in FIG. 19C. In this case also, by visually checking whether or not the assembled member 3 is in a floating state from the bottom of the casing 2 or from the other member 3 assembled formerly, the rightness of the assembly order of the members 3 can be recognized easily.

Similar to the first embodiment, the count of the notches formed on each optical member 3 is not limited to the example as explained here. The number of the notches to be decreased for the members 3 according to the assembly order is not limited to the example as explained here. The protruding part 16 may be incorporated into the upper portion of the frame-shaped casing 2 or isolated like an island (i.e., the protruding part 16 is connected to the casing 2 by way of the bottom of the part 16 alone).

With the backlight unit according to the third embodiment, similar to the structures of FIGS. 5A to 5C, the width, length, and/or interval of the notches may be changed. Like the structures of FIGS. 6A to 6C, the inner periphery of the notches may be changed to any other shape than rectangle, such as a tapered or circular shape. Moreover, like the structures of FIGS. 7A and 7B, two or more of the depressed parts 15 or notch(es) may be respectively formed on two or more edges of the member 3. Like the structure of FIG. 8A, the depressed parts 15 or notch(es) may be respectively formed on the different positions of the members 3.

A LCD device according to the third embodiment comprises as its main components the LCD panel 80 and the backlight unit having one of the above-described structures. The panel 80 is held by the casing 2 of the backlight unit. The optical members 3 assembled in the casing 2 are fixed by the casing 2 and the opposing surface of the panel 80.

OTHER EMBODIMENTS

It is needless to say that the present invention is not limited to the above-described first to third embodiments and their variations. Any other modification is applicable to these embodiments.

For example, with the above-described first to third embodiments of the invention and their variations, the features of the invention are applied to a backlight unit of a LCD device. However, the invention relates to the structure that a plurality of optical members is assembled in a casing in a right or desired order and attitude. Therefore, the invention may be applied to any other structure if it is similar to the structure of the invention. For example, with a semi-transmissive type LCD device, optical members are arranged on the viewing side also. The invention may be applied to such the configuration where these optical members are held by the casing.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A backlight unit comprising:
a light source;
optical members each having a sheet- or plate-like shape; and
a frame-shaped casing for holding the optical members, the optical members being stacked and assembled in the casing;
wherein each of the optical members has a protruding part that protrudes along its plane, the protruding part including at least one protrusion; and
a count of the protrusions of each of the optical members being increased according to a predetermined assembly order in the casing;
and wherein the casing has a depressed part for receiving the protruding parts of the optical members; the depressed part including notches or depressions corresponding to the protrusions of the optical members;
each of the notches or depressions having a depth in a stacking direction that varies according to stacking state of the optical members.

2. The unit according to claim 1, wherein the optical member to be assembled in a second order or later comprises the protrusion formed at a same position as that of the optical member to be stacked in a preceding order, the protrusion of the member in the second order or later being the same in size and shape as the member to be stacked in the preceding order;
and wherein the depth of each of the notches or depressions is defined according to a total thickness of the stacked optical members having the protrusions at the same position.

3. The unit according to claim 1, wherein the notches or depressions are formed to penetrate through the casing from inside of the casing to outside thereof.

4. The unit according to claim 3, wherein the protrusions are formed to stick out of the casing through the corresponding notches when the optical members are assembled in the casing;
and wherein the protrusions are visually recognizable from outside of the casing after assembling operation of the backlight unit is completed.

5. The unit according to claim 1, wherein the at least one protrusion of each of the optical members is located on at least one edge of the member at a position excluding symmetrical positions on the edge.

6. A backlight unit comprising:
a light source;
optical members each having a sheet- or plate-like shape; and
a frame-shaped casing for holding the optical members, the optical members being stacked and assembled in the casing;
wherein each of the optical members has a protruding part that protrudes along its plane, the protruding part including a protrusion; and
a width or shifted distance of the protrusion of each of the optical members being increased according to a predetermined assembly order in the casing;
and wherein the casing has a depressed part for receiving the protruding parts of the optical members; the depressed part including notches or depressions corresponding to the protrusions of the optical members;
each of the notches or depressions having a depth in a stacking direction that varies according to stacking state of the optical members.

7. The unit according to claim 6, wherein the optical member to be assembled in a second order or later comprises the protrusion wider than that of the optical member to be stacked in a preceding order;
and wherein the depth of each of the notches or depressions is defined according to a total thickness of the stacked optical members.

8. The unit according to claim 6, wherein the optical member to be assembled in a second order or later comprises the protrusion shifted at a greater distance than that of the optical member to be stacked in a preceding order;
and wherein the depth of each of the notches or depressions is defined according to a total thickness of the stacked optical members.

9. The unit according to claim 6, wherein the notches or depressions are formed to penetrate through the casing from inside of the casing to outside thereof.

10. The unit according to claim 9, wherein the protrusions are formed to stick out of the casing through the corresponding notches when the optical members are assembled in the casing;
and wherein the protrusions are visually recognizable from outside of the casing after assembling operation of the backlight unit is completed.

11. The unit according to claim 6, wherein the at least one protrusion of each of the optical members is located on at least one edge of the member at a position excluding symmetrical positions on the edge.

12. A backlight unit comprising:
a light source;
optical members each having a sheet- or plate-like shape; and
a frame-shaped casing for holding the optical members, the optical members being stacked and assembled in the casing;
wherein each of the optical members has a depressed part that is depressed along its plane, the depressed part including at least one notch or depression; and
a count of the notches or depressions of each of the optical members being decreased according to a predetermined assembly order in the casing;
and wherein the casing has a protruding part to be fittingly engaged with the depressed parts of the optical members; the protruding part including protrusions corresponding to the notches of the optical members;
each of the protrusions having a height in a stacking direction that varies according to stacking state of the optical members.

13. The unit according to claim 12, wherein the optical member to be assembled in a second order or later comprises the notch or depression formed at a same position as that of the optical member to be stacked in a preceding order, the notch or depression of the member in the second order or later being the same in size and shape as the member to be stacked in the preceding order;
and wherein the height of each of the protrusions is defined according to a total thickness of the stacked optical members having the protrusions at the same position.

14. The unit according to claim 12, wherein the at least one notch or depression of each of the optical members is located on at least one edge of the member at a position excluding symmetrical positions on the edge.

15. A backlight unit comprising:

a light source;

optical members each having a sheet- or plate-like shape; and a frame-shaped casing for holding the optical members, the optical members being stacked and assembled in the casing;

wherein each of the optical members has a depressed part that is depressed along its plane, the depressed part including a notch or depression; and a width or shifted distance of the notch or depression of each of the optical members being decreased according to a predetermined assembly order in the casing;

and wherein the casing has a protruding part to be fittingly engaged with the depressed parts of the optical members; the protruding part including protrusions corresponding to the notches or depressions of the optical members;

each of the protrusions having a height in a stacking direction that varies according to stacking state of the optical members.

16. The unit according to claim 15, wherein the optical member to be assembled in a second order or later comprises the notch or depression formed at a same position as that of the optical member to be stacked in a preceding order, the notch or depression of the member in the second order or later being the same in size and shape as the member to be stacked in the preceding order;

and wherein the height of each of the protrusions is defined according to a total thickness of the stacked optical members having the protrusions at the same position.

17. The unit according to claim 15, wherein the at least one notch or depression of each of the optical members is located on at least one edge of the member at a position excluding symmetrical positions on the edge.

18. A liquid-crystal display device comprising:

a liquid-crystal display panel; and the backlight unit according to one of the claims 1, 6, 12, and 15.

19. The device according to claim 18, wherein the liquid-crystal display panel is held by the casing;

and wherein the optical members are fixed by the panel and the casing.

* * * * *